United States Patent
Niewohner et al.

(10) Patent No.: US 12,016,310 B2
(45) Date of Patent: Jun. 25, 2024

(54) SYSTEM AND METHOD FOR IDENTIFYING AND RECOVERING EXPIRED POULTRY

(71) Applicant: Bird's Eye Robotics, Inc., Herman, NE (US)

(72) Inventors: Scott Niewohner, Herman, NE (US); Lucas Niewohner, Herman, NE (US)

(73) Assignee: Bird's Eye Robotics, Inc., Herman, NE (US)

( * ) Notice: Subject to any disclaimer, the term of this patent is extended or adjusted under 35 U.S.C. 154(b) by 328 days.

(21) Appl. No.: 17/582,835

(22) Filed: Jan. 24, 2022

(65) Prior Publication Data
US 2022/0232807 A1 Jul. 28, 2022

Related U.S. Application Data

(60) Provisional application No. 63/141,671, filed on Jan. 26, 2021.

(51) Int. Cl.
*A01K 45/00* (2006.01)
*G01S 17/89* (2020.01)
(Continued)

(52) U.S. Cl.
CPC ............ *A01K 45/005* (2013.01); *G01S 17/89* (2013.01); *G05D 1/0214* (2013.01);
(Continued)

(58) Field of Classification Search
CPC ....... A01K 45/005; G01S 17/89; G01S 17/86; G05D 1/0214; G05D 1/0238;
(Continued)

(56) References Cited

U.S. PATENT DOCUMENTS 11,019,805 B2 * 6/2021 Hartung .............. G05D 1/0272
11,026,406 B2   6/2021 Planquette
(Continued)

FOREIGN PATENT DOCUMENTS

CN   206212997 U * 6/2017
CN   108935436 A * 12/2018
(Continued)

OTHER PUBLICATIONS

CN206212997.translate (English translate of foreign reference CN206212997U), Liu et al., Agricultural Information INST CAAS (Year: 2017).*
(Continued)

*Primary Examiner* — B M M Hannan
(74) *Attorney, Agent, or Firm* — Suiter Swantz IP

(57) ABSTRACT

A mortality recovery device is described. The mortality recovery device provides for autonomous recovery of expired poultry within an environment, such as a poultry barn. The mortality recovery device includes a linkage assembly by which the expired poultry is conveyed to a container. The mortality recovery device includes one or more cameras for detecting the expired poultry. The mortality recovery device also includes one or more cameras for object detection purposes. The mortality recovery device also includes a camera or a LiDAR for mapping the position and orientation (pose) of the mortality recovery device within the environment. By the object detection and the pose information, the mortality recovery device autonomously travels within the environment. The mortality recovery device also includes a spinner assembly for deterring live poultry from the path of the mortality recovery device.

20 Claims, 21 Drawing Sheets

(51) Int. Cl.
    *G05D 1/00*     (2006.01)
    *G06V 20/56*     (2022.01)
    *G06V 40/10*     (2022.01)

(52) U.S. Cl.
    CPC ......... *G05D 1/0238* (2013.01); *G05D 1/0246* (2013.01); *G05D 1/0274* (2013.01); *G06V 20/56* (2022.01); *G06V 40/10* (2022.01); *G06V 2201/06* (2022.01)

(58) Field of Classification Search
    CPC .... G05D 1/0246; G05D 1/0274; G06V 20/56; G06V 40/10; G06V 2201/06
    USPC .......................................................... 701/50
    See application file for complete search history.

(56) References Cited

U.S. PATENT DOCUMENTS

| | | |
|---|---|---|
| 2003/0132591 A1 | 7/2003 | Woodbury |
| 2004/0245073 A1 | 12/2004 | Hawk et al. |
| 2005/0186898 A1 | 8/2005 | Holland |
| 2016/0000048 A1 | 1/2016 | Dolara |
| 2019/0307106 A1 | 10/2019 | Hartung et al. |
| 2021/0076634 A1 * | 3/2021 | Xu .................... A01K 29/005 |

FOREIGN PATENT DOCUMENTS

| | | | | |
|---|---|---|---|---|
| CN | 109343441 A | * | 2/2019 | ......... G05B 19/0423 |
| CN | 211710885 U | * | 10/2020 | |
| CN | 212265845 U | * | 1/2021 | |
| CN | 112658005 A | * | 4/2021 | |
| CN | 215912938 U | * | 3/2022 | ............ A01K 45/005 |
| CN | 113016663 B | * | 6/2022 | ............ A01K 45/005 |
| EP | 2967003 B1 | | 11/2018 | |
| JP | 2019201578 A | * | 11/2019 | |
| JP | 2021078447 A | * | 5/2021 | |

OTHER PUBLICATIONS

JP2019201578.translate (English translate of foreign reference JP2019201578A), Noma et al., NEC Solution Innovators Ltd (Year: 2019).*
Epp, Melanie, "Poultry Technology: Rise of the robots", Canadian Poultry, Jan. 23, 2019, 8 pages.
Search Report and Written Opinion in International Application No. PCT/US2022/013785 dated Apr. 14, 2022, 7 pages.

* cited by examiner

SYSTEM AND METHOD FOR IDENTIFYING AND RECOVERING EXPIRED POULTRY

CROSS-REFERENCE TO RELATED APPLICATION

The present application claims the benefit of U.S. Provisional Application Ser. No. 63/141,671, filed on Jan. 26, 2021, titled SYSTEM AND METHOD FOR IDENTIFYING AND RECOVERING EXPIRED POULTRY, naming Scott Niewohner and Lucas Niewohner as inventors, which is incorporated herein by reference in the entirety.

TECHNICAL FIELD

The present disclosure generally relates to animal husbandry, and more particularly to expired poultry recovery.

BACKGROUND

Poultry are commonly raised in poultry barns, such as broiler barns (or houses), turkey barns, and the like. Prior to harvesting the poultry, a number of animals may prematurely die. The removal of such expired poultry is critical to maintain proper sanitation and to ensure the viability of the living stock of poultry. Removal of expired poultry in barns is frequently a time-consuming process that requires significant amounts of human labor. To remove the expired poultry a human operator must manually walk around the poultry barn and pick up the expired poultry. However, prolonged exposure of the human operator to poultry dust and gases within poultry environments (e.g., barns) may have a deleterious effect. Therefore, it would be advantageous to provide one or more of a device, system, or method that provides for the removal of the expired poultry.

SUMMARY

A mortality recovery device is disclosed, in accordance with one or more embodiments of the present disclosure. In one illustrative embodiment, the mortality recovery device includes a chassis. In another illustrative embodiment, the mortality recovery device includes a container coupled to the chassis. In another illustrative embodiment, the mortality recovery device includes one or more drive wheels for propelling the chassis in a forward path. In another illustrative embodiment, the mortality recovery device includes a linkage assembly including a lift member and a grapple member. The lift member is coupled to the chassis and includes a platform. The lift member is configured to rotate relative to the chassis thereby lifting the platform above the container. The grapple member is coupled to lift member and is configured to rotate relative to the lift member. In another illustrative embodiment, the mortality recovery device includes a first camera posed such that the first camera is configured to capture a first image stream including at least a first area disposed in the forward path. In another illustrative embodiment, the mortality recovery device includes one or more processors and a memory. The one or more processors are configured to execute a set of program instructions stored in the memory. The set of program instructions cause the one or more processors to perform image recognition on the first image stream to detect an expired poultry in the forward path. The set of program instructions cause the one or more processors to rotate the grapple member relative to the lift member for conveying the expired poultry onto the platform. The set of program instructions cause the one or more processors to and rotate the lift member relative to the chassis for conveying the expired poultry from the platform to the container.

A mortality recovery system is disclosed, in accordance with one or more embodiments of the present disclosure. In one illustrative embodiment, the mortality recovery system includes a poultry barn including a ceiling, a ground, feed lines, and water lines. The feed lines and the water lines are disposed between four and forty-eight inches from the ground. In another embodiment, the mortality recovery system includes one or more mortality recovery devices. In one illustrative embodiment, the mortality recovery device includes a chassis. In another illustrative embodiment, the mortality recovery device includes a container coupled to the chassis. In another illustrative embodiment, the mortality recovery device includes one or more drive wheels for propelling the chassis in a forward path. In another illustrative embodiment, the mortality recovery device includes a linkage assembly including a lift member and a grapple member. The lift member is coupled to the chassis and includes a platform. The lift member is configured to rotate relative to the chassis thereby lifting the platform above the container. The grapple member is coupled to lift member and is configured to rotate relative to the lift member. In another illustrative embodiment, the mortality recovery device includes a first camera posed such that the first camera is configured to capture a first image stream including at least a first area disposed in the forward path. In another illustrative embodiment, the mortality recovery device includes one or more processors and a memory. The one or more processors are configured to execute a set of program instructions stored in the memory. The set of program instructions cause the one or more processors to perform image recognition on the first image stream to detect an expired poultry in the forward path. The set of program instructions cause the one or more processors to rotate the grapple member relative to the lift member for conveying the expired poultry onto the platform. The set of program instructions cause the one or more processors to and rotate the lift member relative to the chassis for conveying the expired poultry from the platform to the container.

A method of mortality recovery is disclosed, in accordance with one or more embodiments of the present disclosure. In one illustrative embodiment, the method includes detecting, by one or more processors, an expired poultry in an image received from a camera by applying an image recognition model to the image. In another illustrative embodiment, the method includes engaging one or more drive wheels to position the expired poultry between a grapple member and a platform of a lift member by providing a control signal from the one or more processors to one or more drive wheel motors. In another illustrative embodiment, the method includes engaging the grapple member to convey the expired poultry onto the platform by rotating the grapple member relative to the lift member. In another illustrative embodiment, the method includes engaging the lift member to convey the expired poultry from the platform to a container by rotating the lift member relative to a chassis

BRIEF DESCRIPTION OF THE DRAWINGS

The numerous advantages of the disclosure may be better understood by those skilled in the art by reference to the accompanying figures in which.

DETAILED DESCRIPTION

Figure 1A:
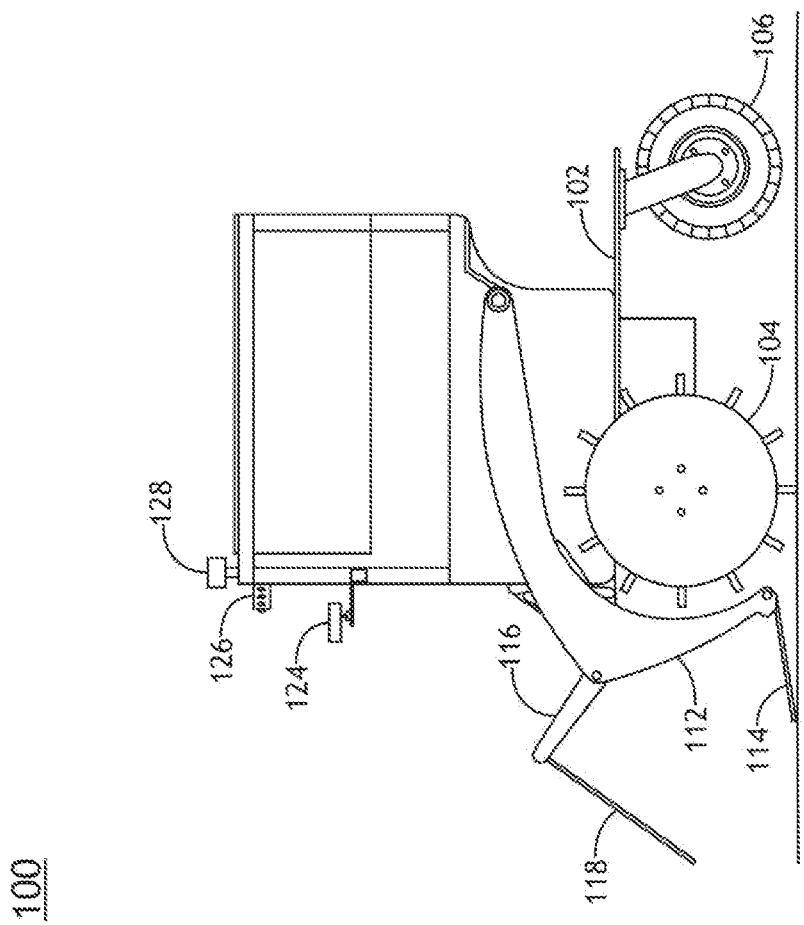
FIG. 1A illustrates a side view of a mortality recovery device, in accordance with one or more embodiments of the present disclosure.
Figure 1B:
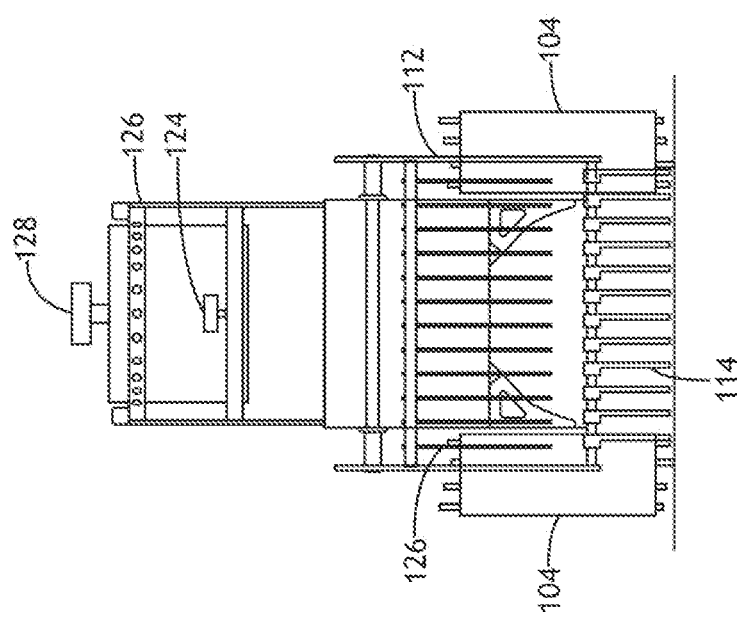
FIG. 1B illustrates a front view of a mortality recovery device, in accordance with one or more embodiments of the present disclosure.
Figure 1C:
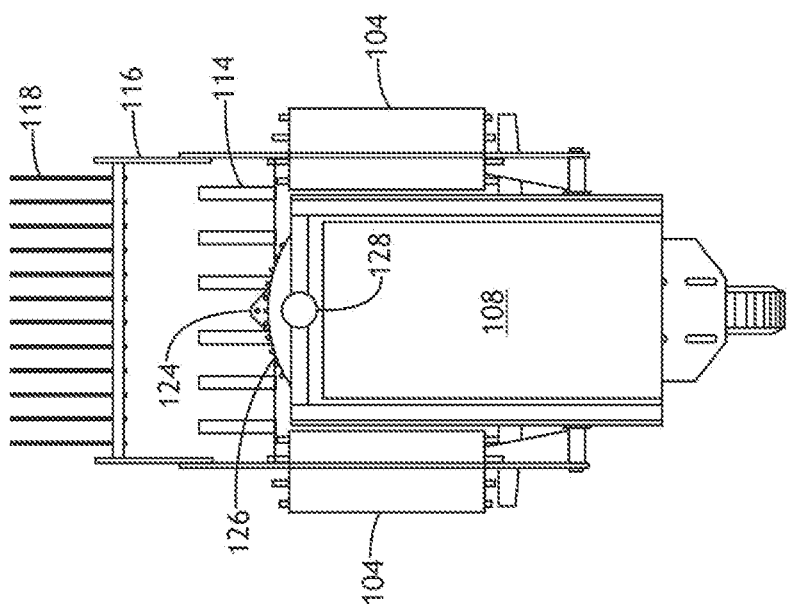
FIG. 1C illustrates a top view of a mortality recovery device, in accordance with one or more embodiments of the present disclosure.
Figure 1D:
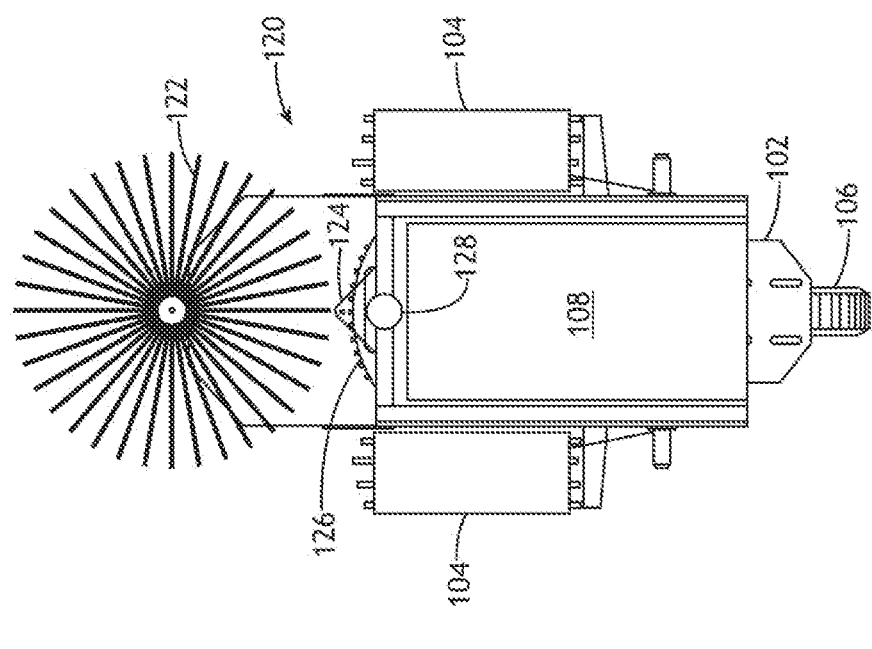
FIG. 1D illustrates a top view of a mortality recovery device with a deterrent spinner deployed, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed to a mortality recovery device for recovering expired poultry from poultry barns, and the like. The mortality recovery device may also be configured to autonomously path within a confined space, such as a broiler barn or other the like, by one or more of obstacle detection or environmental mapping. The mortality recovery device may also detect an expired poultry within the environment by an image recognition method. The mortality recovery device may be configured to perform mortality recovery of an expired poultry. For example, the mortality recovery device may include a linkage assembly may sweep and rotate an expired poultry into a container (also referred to as a dead box) for recovering the expired poultry from the environment.

Referring now to FIGS. 1A-1D, a mortality recovery device 100 is described in accordance with one or more embodiments of the present disclosure. The mortality recovery device 100 may include one or more of a chassis 102, drive wheels 104, caster wheel 106, container 108, linkage assembly 110, spinner assembly 120, and one or more sensors. Various components of the mortality recovery device 100 may be coupled to the chassis 102, such as, but not limited to, the drive wheels 104, caster wheel 106, the container 108, the linkage assembly 110, the spinner assembly 120, or the sensors. By the arrangement of the various components, the mortality recovery device 100 may be provided to autonomously travel within a poultry barn and recover expired poultry from a ground surface of the poultry barn.

The drive wheels 104 may propel the chassis in a forward path. In this regard, the drive wheels may be selectively rotated by one or more drive wheel motors 208, or the like. In embodiments, the drive wheels 104 include a spiked tread (e.g., a tread with rods integrated into one or more portions of the wheels, where the rods may be configured to provide traction, till, and/or break up debris or other material disposed within a poultry environment). The spiked tread may provide for tiling a bedding of as the drive wheels 104 are rotated. In this regard, the plurality of wheels may be configured to reduce a buildup of noxious and/or harmful substances within the poultry environment (e.g., ammonia). It is further contemplated that the drive wheels 104 may include any wheel known in the art, such as, but not limited to, a rubber tread or a continuous wheel (also known as continuous track or caterpillar track), and the like. In embodiments, the drive wheels 104 are independently controllable for propelling and turning the chassis. By the independent control of the drive wheels 104, the mortality recovery device 100 may be considered to include differential steering (also referred to as skid steer). In embodiments, the mortality recovery device 100 may include a zero-degree turning radius by the independent control of the first drive wheel and the second drive wheel which may be advantageous for navigating within enclosed environments, such as broiler barns and the like. Although the drive wheels 104 are described as being independently controlled, this is not intended as a limitation of the present disclosure. In this regard, the mortality recovery device 100 may include a steering mechanism for torque steering the mortality recovery device 100.

In embodiments, the mortality recovery device 100 includes one or more caster wheels 106. As depicted, the caster wheels 106 may be disposed behind the drive wheels 104, relative to the forward path of the mortality recovery device 100. Such caster wheels 106 may be pivotably mounted, such that the caster wheels 106 may automatically align themselves with the direction of travel. By the caster wheels 106, the mortality recovery device 100 may include the zero-degree turning radius. Although the mortality recovery device 100 is described as including the caster wheels 106, this is not intended as a limitation on the present disclosure. In this regard, the mortality recovery device 100 may include one or more additional drive wheels, which may or may not be independently controllable. The mortality recovery device 100 may also include one or more idler wheels or the like. In this regard, the mortality recovery device 100 may include various permutations of drive wheels, idler wheels, caster wheels, front steering, rear steering, or skid steering to accomplish steering and propulsion.

The mortality recovery device 100 may also include the container 108 coupled to the chassis 102. The container 108 may act a dead box storage for expired poultry. In embodiments, the container 108 is pivotally mounted to the chassis 102. A container motor 216 may also be coupled between the container 108 and the chassis 102 for pivoting the container relative to the chassis for dumping expired poultry (e.g., dumping from a rear).

In embodiments, the mortality recover device 100 includes the linkage assembly 110 coupled to the chassis 102. The linkage assembly 110 may include one or of a lift member 112, platform 114, grapple member 116, or tines 118. The linkage assembly 110 may function as a skid-loader lift or actuator arm that conveys expired poultry from the ground into the container 108, as described further herein.

The lift member 112 may be coupled to the chassis 102 and include the platform 114. For example, the lift member 112 may be pivotably coupled to the chassis 102. By the pivotable connection, the lift member 112 may be rotated relative to the chassis 102 for lifting the platform 114 from the ground to a position above the container 108. The platform 114 may also be rotated to dump the expired poultry into the container 108. The pivotable action of the lift member 112 may be provided by a lift motor 210 (e.g., an electric motor, a linear actuator, or the like). In embodiments, the platform 114 includes one or more tines. The tines may be spaced to allow bedding to pass through the tines, such that the bedding is not conveyed to the container 108 by the platform 114. Such tines may include, but are not limited to, tines with a length between four and ten inches. Although the platform 114 is described as including tines, this is not intended as a limitation on the present disclosure. In this regard, the platform 114 may generally include any shape which is suitable for conveying the expired poultry to the container 108. In embodiments, the platform 114 is spring-mounted to the lift member 112. By the spring mount, the platform 114 may be rotated relative to the lift member 112 when the platform 114 is raised above container 108.

The grapple member 116 may be coupled to the lift member 112 and include one or more tines 118. For example, the grapple member 116 may be pivotably coupled to the lift member 112. By the pivotable connection, the grapple member 116 may be rotated relative to the lift member 112 for moving the tines 118 towards the platform 114. The movement of the tines 118 towards the platform 114 may cause the tines 118 to rake expired poultry onto the platform 114. The pivotable action of the grapple member 116 may be provided by a grapple motor 212 (e.g., an electric motor, a linear actuator, or the like). In a similar fashion to the tines of the platform 114, the tines 118 may be spaced to allow bedding to pass through the tines 118, such that the bedding is not raked onto the platform 114. Such tines may include, but are not limited to, tines with a length between four and ten inches. Although the grapple member 116 is described as including the tines 118, this is not intended as a limitation on the present disclosure. In this regard, the grapple member 116 may generally include any shape which is suitable for raking the expired poultry onto the platform 114. In embodiments, the grapple member 116 translates the tines 118 upwards as the platform 114 is raised for clamping the expired poultry between the tines 118 and the platform 114. By the clamping, the expired poultry may be prevented from falling off of the platform 114 prior to the platform 114 being raised above the container 108. The tines 118 may remain clamped for some portion of the upward motion, such as, but not limited to, when the platform 114 is disposed above the container 108. As may be understood, the specific duration of the clamping may be selectively adjusted based on kinematic chain (also referred to as rigid body) design methodologies.

In embodiments, the mortality recovery device 100 includes the spinner assembly 120. The spinner assembly 120 may include one or more flexible members 122. Such flexible members 122 may include, but are not limited to, a plastic material with a length between 12 and 36 inches. The spinner assembly 120 may retain the flexible members 122 in a hub that attaches to a spinner motor 206. By the spinner motor 206, the spinner assembly 120 may rotate the flexible members 122 for deterring live poultry from a forward path of the mortality recovery device 100, thereby evacuating the live poultry from the drive wheels 104, the grapple member 116, or the platform 114. In some instances, the spinner assembly 120 may rotate the flexible members 122 parallel to the ground, although this is not intended to be limiting. It is contemplated that by rotating the flexible members 122 parallel to the ground, live poultry in a forward path of the mortality recovery device 100 may be deterred to a side of the mortality recovery device 100.

In embodiments, the spinner assembly 120 may be positioned between an extended position and a retracted position. In this regard, the spinner assembly 120 may include one or more linkages and an actuator for retracting or extending the spinner assembly 120. For example, the spinner assembly 120 may be extended for deterring poultry from the forward path. Upon detection of an expired poultry, the spinner assembly 120 may then be retracted. By retracting the spinner assembly 120, a likelihood of the flexible members 122 becoming entangled with the tines 118 or the platform 114 may be reduced. The spinner assembly 120 may be retracted and/or folded within a stowage compartment.

In embodiments, the mortality recovery device 100 includes one or more sensor units, such as, but not limited to, camera, lidar, proximity sensor, proximity switches, global positioning (GPS) sensors, and the like. The sensor units may measure one or more signals indicative of one or more conditions within the poultry environment. For example, the sensors may include, but are not limited to, a camera 124, a camera 126, or a camera 128. The sensors may provide various data for autonomously controlling a pathing of the mortality recovery device 100, avoiding obstacles, and detecting live or expired poultry. Such cameras may be coupled to one or more components of the mortality recovery device 100, such as, but not limited to, the chassis 102. As may be understood, the various cameras described herein may include any suitable camera known in the art, such as, but not limited to, a charge couple device (CCD) detector, a complementary metal-oxide semiconductor (CMOS), or the like. Furthermore, the camera 124, the camera 126, or the camera 128 may optionally include a light source for illuminating an image stream captured by the associated camera.

In embodiments, the mortality recovery device 100 may include the camera 124. The camera may be considered a bird detection camera. In this regard, the camera 124 may be posed (positioned and oriented) on the mortality recovery device 100 such that the camera 124 is configured to capture an image stream including an area disposed in the forward path of the mortality recovery device 100. Such area may include, but is not limited to, an area between the platform 114 and the tines 118. The area between the platform 114 and the tines 118 may be beneficial for generating sensor data indicative of expired poultry which are ready for grappling by the tines 118. In this regard, the camera 124 may generally be pointed at the ground in front of the mortality recovery device 100. The image stream from the camera 124 may then be provided to one or more processors 202 for detecting expired poultry and/or live poultry within the forward path. In response to detecting the live poultry, the spinner motor 206 may be engaged for deterring the live poultry. In response to detecting the expired poultry, the processors 202 may provide control signals to the grapple motor 212 and the lift motor 210 for conveying the expired poultry to the container 108.

In embodiments, the camera 124 may also be considered an object detection camera. In this regard, the camera 124 may be posed on the mortality recovery device 100 such that the camera 124 is configured to capture an image stream including an area disposed at a height of between four and forty-eight inches from the ground. By being disposed at such height, the camera may capture an image stream which may be advantageous in identifying objects within a poultry barn, such as a feed line or a water line. It is further contemplated that one or more additional cameras may be provided for the object detection purposes, such as, but not limited to, the camera 126. The image stream from the camera 124 may be provided to the processor 202 for detecting the obstacles. The processors 202 may also provide control signals to the drive wheel motors 208 based on the obstacles within the image stream of the camera 124, for avoiding the obstacles.

In embodiments, the angle-of-view of the camera 124 is sufficient to capture both the ground and one or more of the feed lines or water lines. In embodiments, the mortality recovery device 100 includes both of the camera 124 and the camera 126. The camera 126 may be considered an object detection camera. In this regard, the camera 126 may be posed such that the camera 126 is configured to capture an image stream including the area at the height of between four and forty-eight inches from the ground. The area disposed at a height of between four and forty-eight inches from the ground may be advantageous in identifying objects within a poultry barn, such as said feed lines or water lines. In a similar fashion to the image stream from the camera 124, the image stream from the camera 126 may be provided to the processor 202 for detecting the obstacles and providing control signals to the drive wheel motors 208 based on the obstacles detected within the image stream of the camera 126. In some instances, multiple of the camera 126 may be provided, such as, for one or more sides of the mortality recovery device 100. In embodiments, the camera 126 is a stereo camera including two or more lenses for capturing three-dimensional images. Such three-dimensional images may be advantageous assisting the processor 202 in detecting obstacles within the environment.

In embodiments, the mortality recovery device 100 may include the camera 128. The camera 128 may be considered a mapping camera. In this regard, the camera 128 is posed such that the camera 128 is configured to capture an image stream including at least a portion of a ceiling disposed above the mortality recovery device 100. The camera 128 may include a fisheye lens with an angle-of-view between one-hundred and one-hundred eighty degrees. The angle-of-view between one-hundred and one-hundred eighty degrees may be advantageous in capturing a significant portion of the ceiling within the image stream. By capturing the ceiling, a map of the surrounding environment may be generated. The image stream may be provided to the processors 202 for generating the map, determining a pose of the autonomous navigation device 100 within the map, and providing control signals to the drive wheel motors 208 based on the image stream from the camera 128 for navigating the mortality recovery device within the environment.

Although the mortality recovery device 100 is described as including the camera 128, this is not intended as a limitation of the present disclosure. In embodiments, the mortality recovery device 100 may include a light detection and ranging (LiDAR) sensor 214, or the like. In a similar fashion to the camera 128, the LiDAR sensor 214 may be posed on the mortality recovery device for navigation purposes. The LiDAR sensor 214 may capture a point cloud indicative of a distance from the mortality recovery device 100 to one or more portions of the ceiling. The point cloud may be provided to the processors 202 for generating the map, determining a pose of the autonomous navigation device 100 within the map, and providing control signals to the drive wheel motors 208 based on the point cloud from the LiDAR sensor 214 for navigating the mortality recovery device within the environment.

Figure 2:
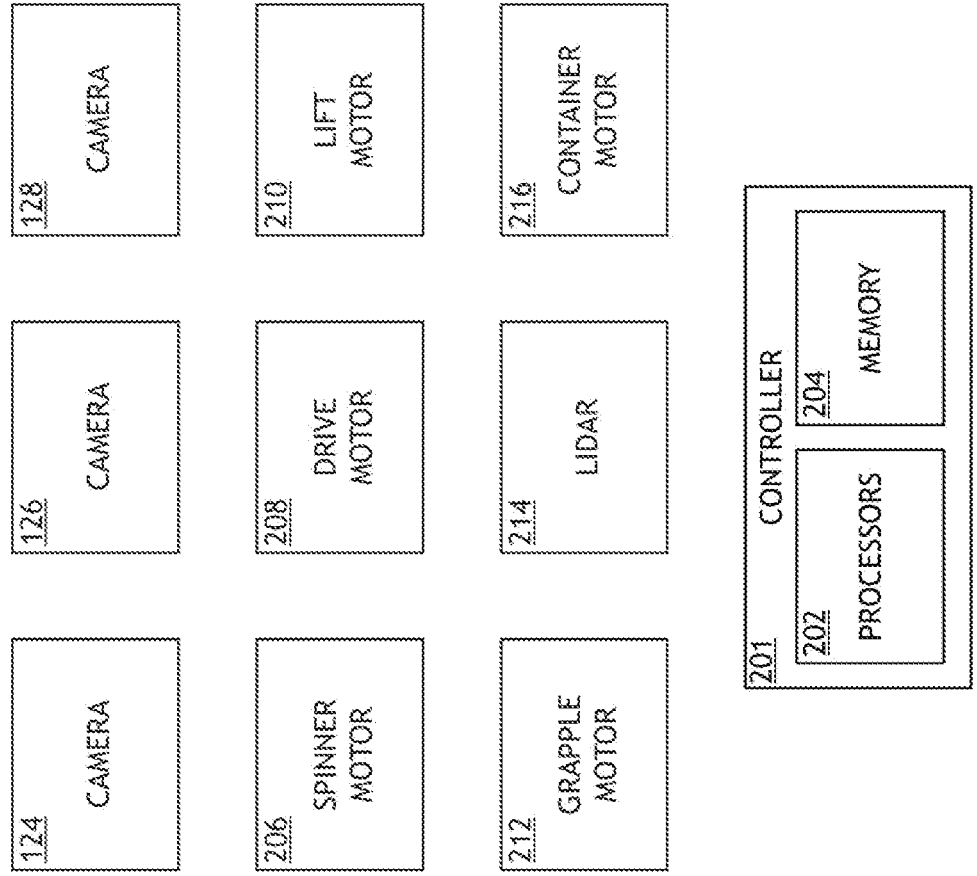
FIG. 2 illustrates a simplified schematic diagram of a control system of a mortality recovery device, in accordance with one or more embodiments of the present disclosure.

Referring now to FIG. 2, a simplified block diagram of the mortality recovery device 100 is described, in accordance with one or more embodiments of the present disclosure. In embodiments, the mortality recovery device 100 includes a controller 201 including one or more processors 202 and a memory 204. The processors 202 may be communicatively coupled to one or more components of the mortality recovery device 100, such as, but not limited to, the camera 124, the camera 126, the camera 128, the spinner motor 206, the drive wheel motor 208, the lift motor 210, the grapple motor 212, the LiDAR 214, or the container motor 216. The processors 202 may also be configured to execute one or more sets of program instructions stored in the memory 204, by which the processors 202 may be configured to carry out one or more steps of the present disclosure. The program instructions may include one or more algorithms, such as, but not limited to, a computer vision algorithm, a machine learning algorithm, a deep learning algorithm, visual simulation location and mapping (VSLAM) algorithm, a navigation algorithm, or the like. In embodiments, the one or more processors 202 may be configured to one or more of generate a map of a poultry environment (e.g., based on markings from the ceiling), provide one or more autonomous navigation signals based on the map, detect one or more feed lines or water lines within the poultry environment, provide one or more autonomous navigation signals based on the detect feed lines or water lines, detect one or more poultry within the poultry environment, determine an expiration condition of the one or more poultry, or provide controls to one or more components of the mortality recovery device 100 for retrieving the expired poultry.

The one or more processors 202 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 202 may include any device configured to execute algorithms and/or instructions (e.g., program instructions stored in memory). In embodiments, the one or more processors 202 may be embodied as a desktop computer, image computer, parallel processor, networked computer, or any other computer system configured to execute a program instruction as described throughout the present disclosure. Further, the steps described throughout the present disclosure may be carried out by a single processor or multiple processors. Additionally, the controller 201 may include one or more processors housed in a common housing or within multiple housings. In this way, any controller or combination of controllers may be separately packaged as a module suitable for integration into the mortality recovery device 100. Further, the processors 202 may analyze data received from the various sensors and feed the data to additional components within the mortality recovery device 100 or external to the mortality recovery device 100.

The memory 204 may include any storage medium known in the art suitable for storing program instructions executable by the associated one or more processors 202. For example, the memory 204 may include a non-transitory memory medium. By way of another example, the memory 204 may include, but is not limited to, a read-only memory (ROM), a random-access memory (RAM), a magnetic or optical memory device (e.g., disk), a solid-state drive and the like. It is further noted that memory 204 may be housed in a common controller housing with the one or more processors 202. In one embodiment, the memory 204 may be located remotely with respect to the physical location of the one or more processors 202 and controller 201. For instance, the one or more processors 202 of controller 201 may access a remote memory (e.g., server), accessible through a network (e.g., internet, intranet and the like). In embodiments, the memory maintains program instructions for causing the one or more processors to carry out the various steps described through the present disclosure.

In embodiments, the processors 202 may be configured to receive one or more signals indicative of one or more conditions within the poultry environment from one or more sensor units of the mortality recovery device 100. The one or more conditions within the poultry environment my include, but are not limited to, one or more obstacles (e.g., feed line, or water line), one or more poultry birds, one or more expiration conditions of one or more poultry birds (e.g., one or more signals indicative of a dead bird and/or one or more signals indicative of a live bird), or one or more maps of the poultry environment. The map may dictate locations of anomalies within a barn and provide markings of the ceiling for assisting with object detection or autonomous navigation. The map may be generated from an image stream or a point cloud of a ceiling using a visual simulation location and mapping (VSLAM) algorithm, or the like. In another regard, the signals indicative of one or more conditions within the poultry environment collected by the one or more sensor units may be configured to allow the processors 202 to generate maps of the poultry environment and/or identify expired poultry within the poultry environment.

In embodiments, the processors 202 may be configured to provide one or more control signals to one or more portions of the mortality recovery device 100 based on the one or more signals indicative of one or more conditions within the poultry environment. For example, the processors 202 may be configured to provide one or more control signals to one or more propulsion systems (e.g., the drive wheel motor 208) for autonomously pathfinding within the poultry barn, such that the mortality recovery device 100 may approach an expired bird for recovery. In this regard, the signals indicative of one or more conditions within the poultry environment collected by the one or more sensor units may be configured to allow the mortality recovery device 100 to navigate (e.g., either autonomously or in response to one or more control signals, including, without limitation, control signals provided by a user) within the poultry environment. The one or more sensor units may be configured to allow the mortality recovery device 100 to avoid obstacles within the poultry environment (e.g., feeders, waterers, fences, walls, humans, birds, or the like). By way of another example, upon determination of a presence of one or more live poultry, the processors 202 may be configured to provide one or more control signals to the one or more poultry avoidance sub-systems (e.g., the spinner motor 206) such that the one or more poultry avoidance sub-systems cause the unexpired poultry birds to evacuate an area near the mortality recovery device 100. The evacuation of the live poultry may then allow the mortality recovery device 100 to resume pathfinding without injuring the live poultry. By way of another example, upon determination of an existence of one or more expired poultry birds, the processors 202 may be configured to provide one or more control signals to one or more poultry retrieval sub-systems, where the control signals are configured to cause the one or more poultry retrieval sub-systems to recover the expired poultry.

Figure 3:
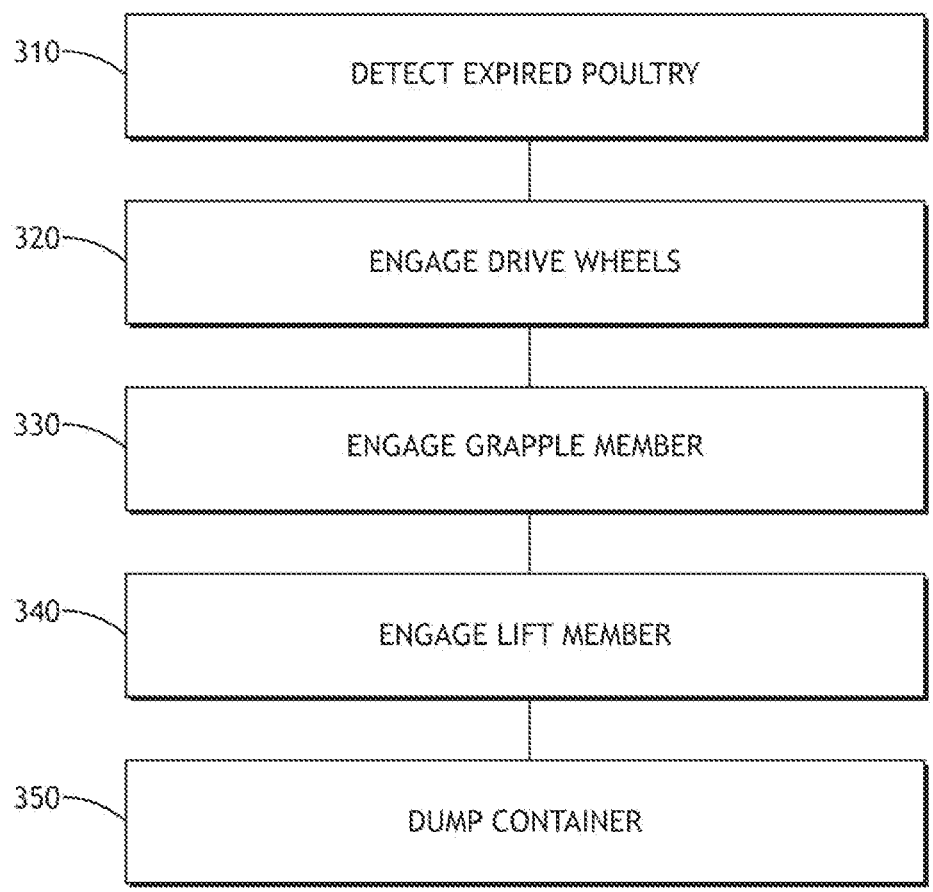
FIG. 3 illustrates a flow diagram of a method of mortality recovery, in accordance with one or more embodiments of the present disclosure.

Referring now to FIG. 3, a flow diagram of a method 300 is described, in accordance with one or more embodiments of the present disclosure. The embodiments and the enabling technology described previously herein in the context of the mortality recovery device 100 should be interpreted to extend to the method 300. For example, one or more steps of the method 300 may be implemented by the processors 202 executing software-executable codes. It is further recognized, however, that the method 300 is not limited by the mortality recovery device 100.

In a step 310, an expired poultry is detected in an image from a camera. The expired poultry may be detected by applying an image recognition model to the image. The image recognition model may include any suitable image recognition model, such as, but not limited to, a blob detection model or a pretrained imaged detection model. The blob detection model may compare a color offset between the bedding and the expired poultry. The pretrained image detection model may be trained with annotated images of barn data using one or more machine learning algorithms, such as, but not limited to, a classification algorithm. In some instances, a spinner motor is disengaged and a spinner assembly is retracted upon detecting the expired poultry.

In a step 320, one or more drive wheels are engaged to position the expired poultry between a grapple member and a platform. The drive wheels may be engaged by providing one or more control signals from a processor to a drive wheel motor causing drive wheels to be rotated.

In a step 330, a grapple member is engaged to convey expired poultry onto the platform. The grapple member may be engaged by providing one or more control signals from the processor to a grapple motor causing the grapple to rotate relative to the lift member.

In a step 340, a lift member is engaged to convey the expired poultry from the platform into a container. The lift member may be engaged by providing one or more control signals from the processor to a lift motor causing the lift member to rotate relative to a chassis. Subsequent to conveying the expired poultry to the container, the spinner assembly may be extended. The mortality recovery device may then resume autonomous navigation of the environment.

Optionally, in a step 350, the container is dumped. The container may be dumped by engaging a container motor 216 causing the container to rotate relative to a chassis for dumping the expired poultry within the container from a rear opening of the container. The container may be dumped upon a given number of expired poultry being received within the container. Furthermore, the container may be selectively positioned to a dump location which is suitable for receiving the expired poultry.

Figure 4A:
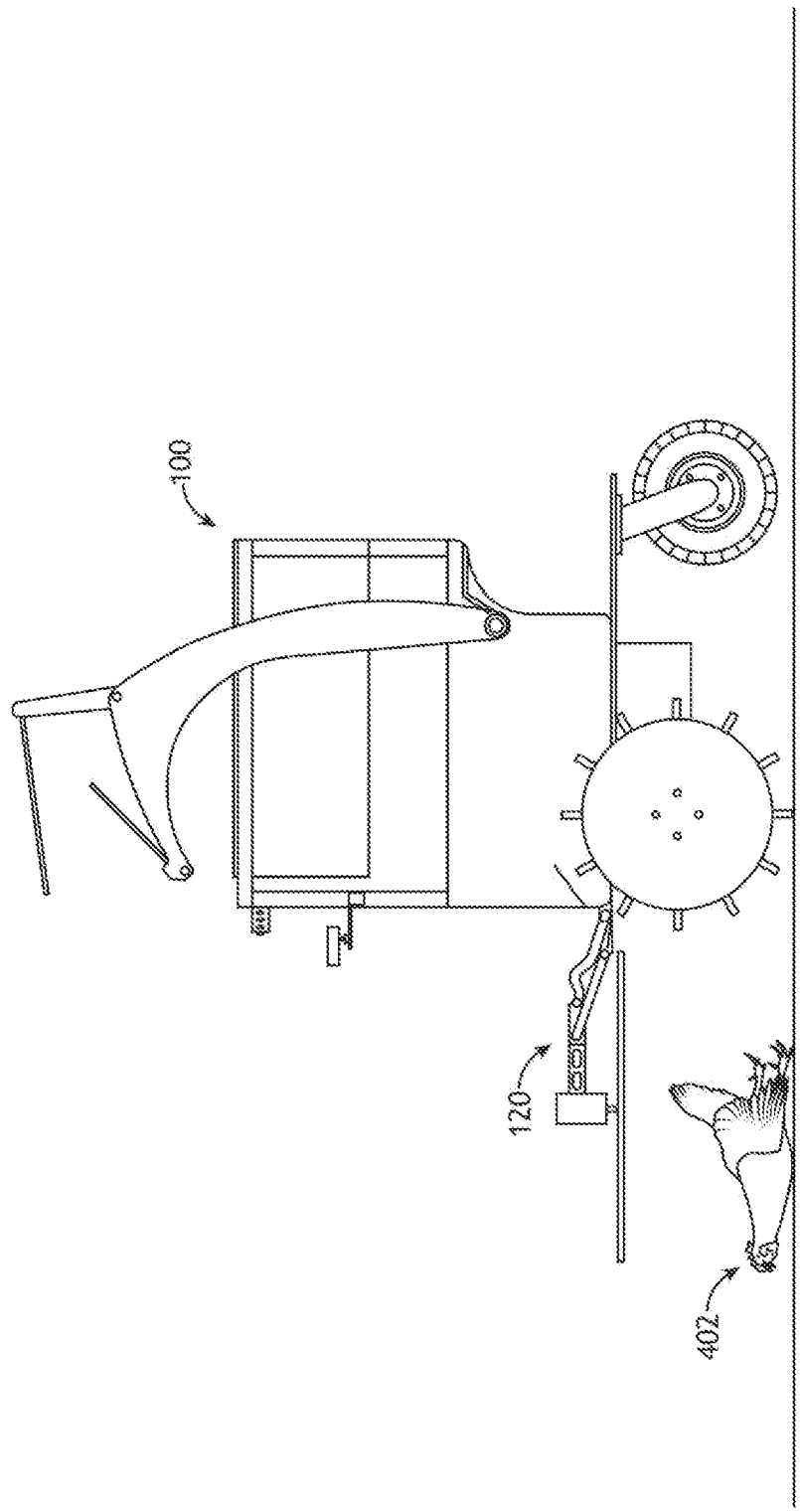
FIGS. 4A-4H illustrates a side view of a mortality recovery device implementing a method of mortality recovery, in accordance with one or more embodiments of the present disclosure.
Figure 4B:
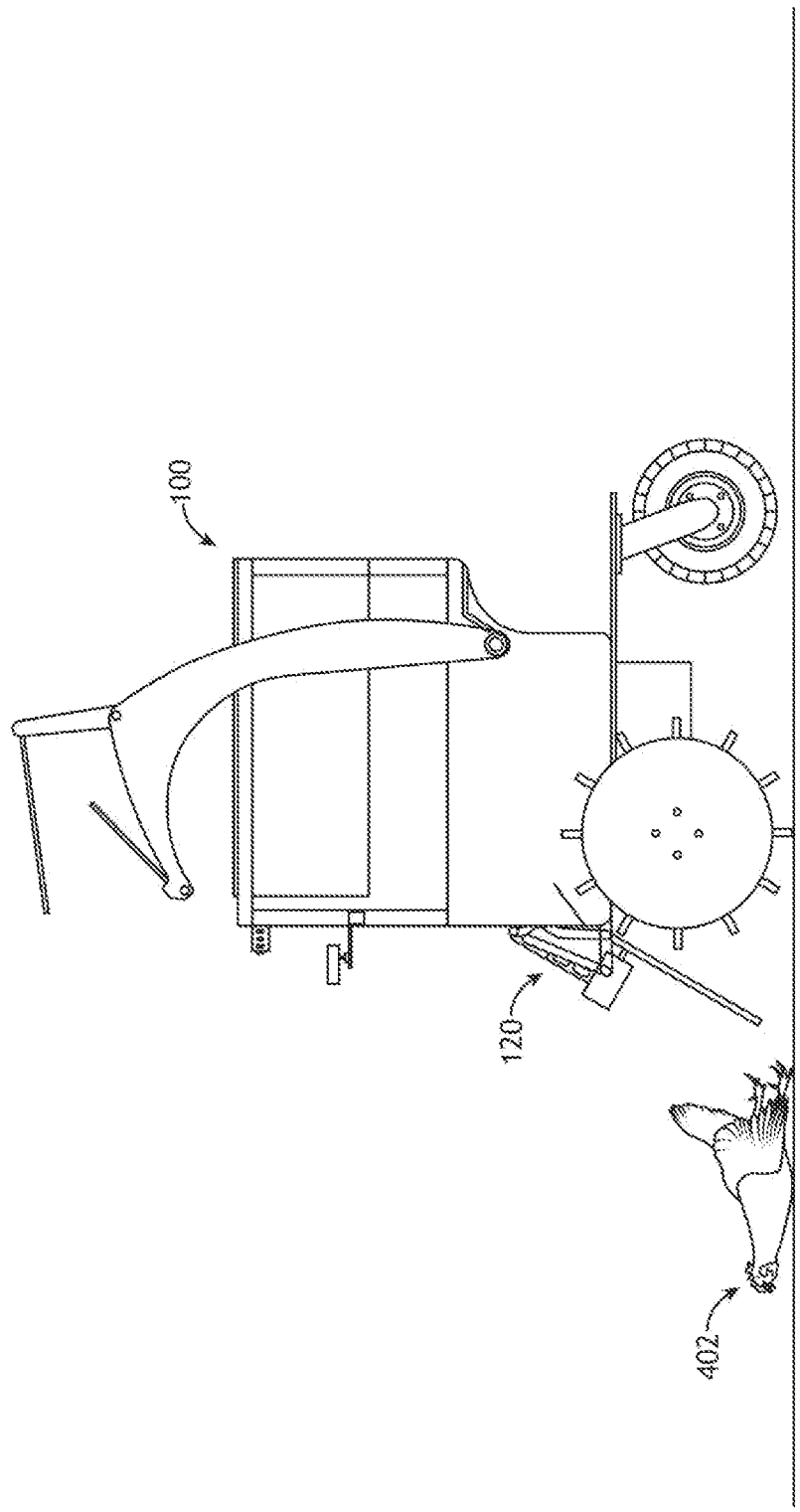
Figure 4C:
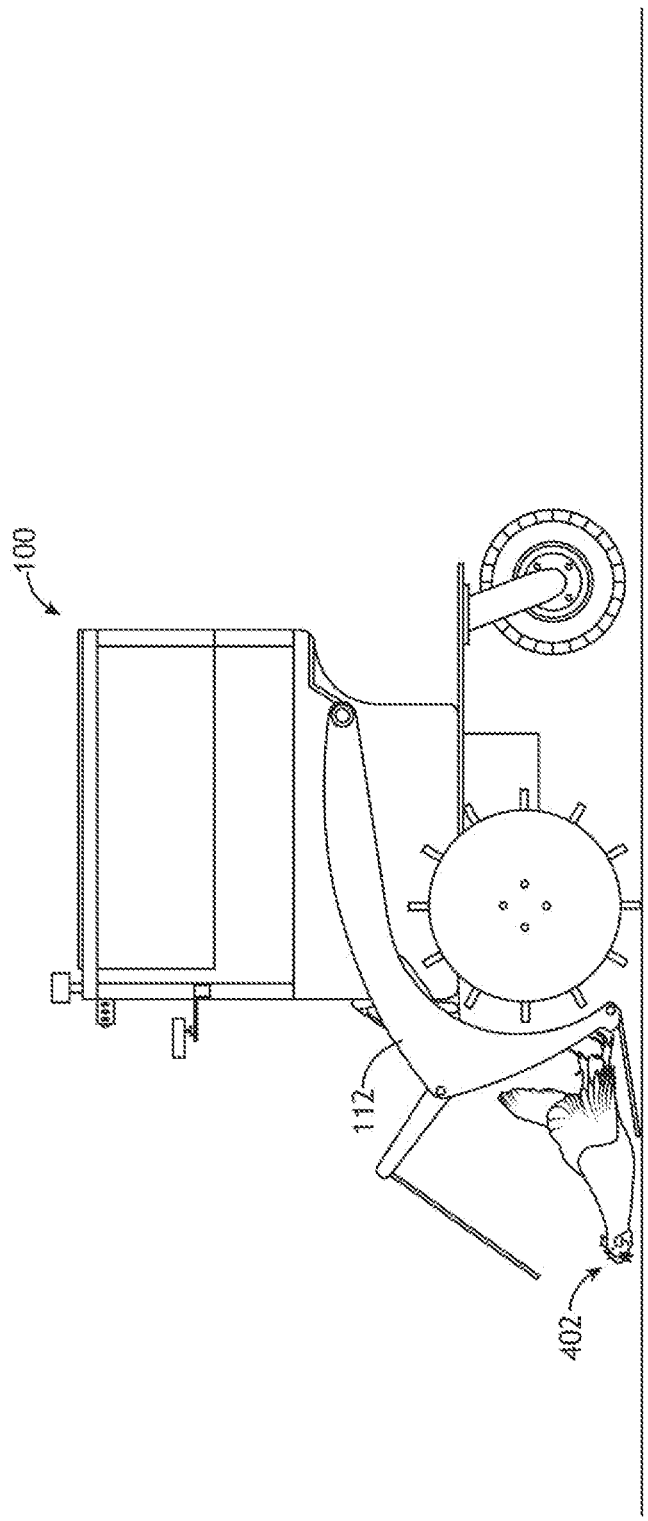
Figure 4D:
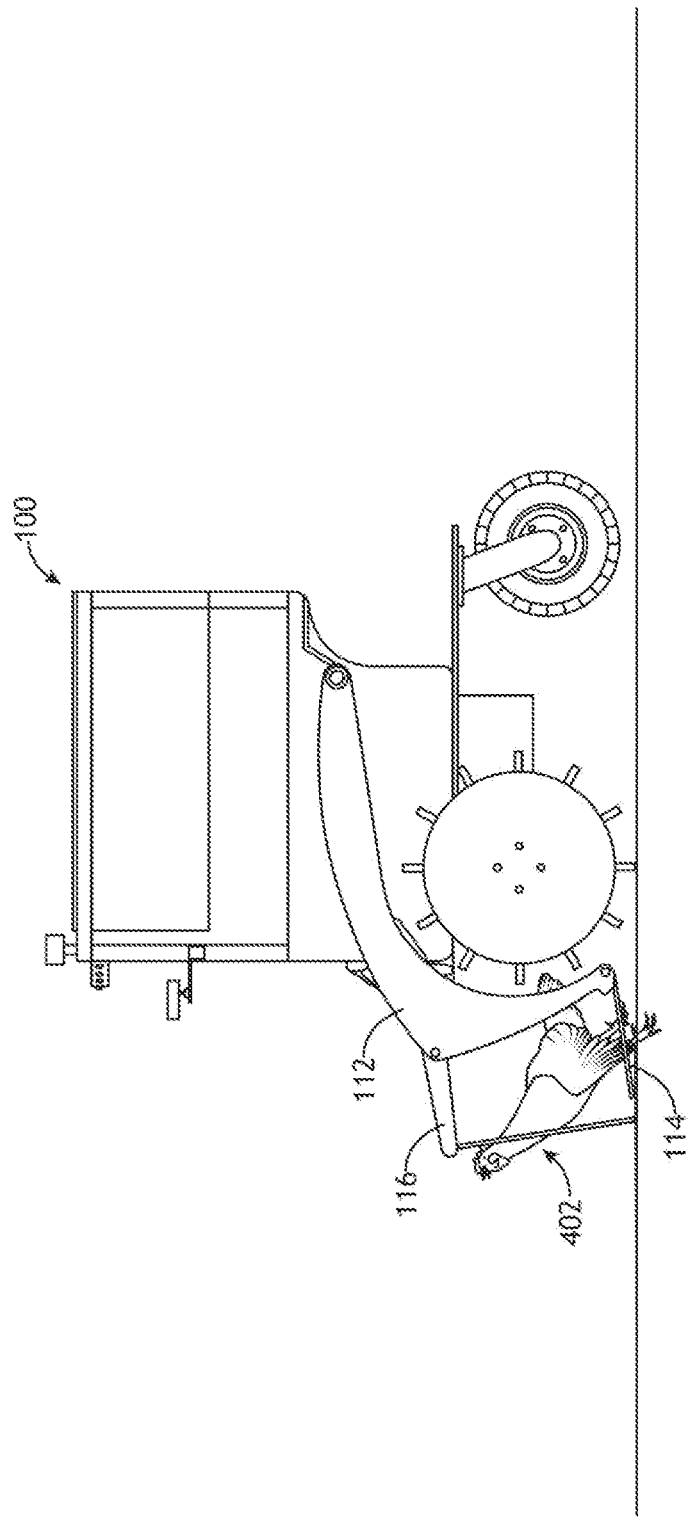
Figure 4E:
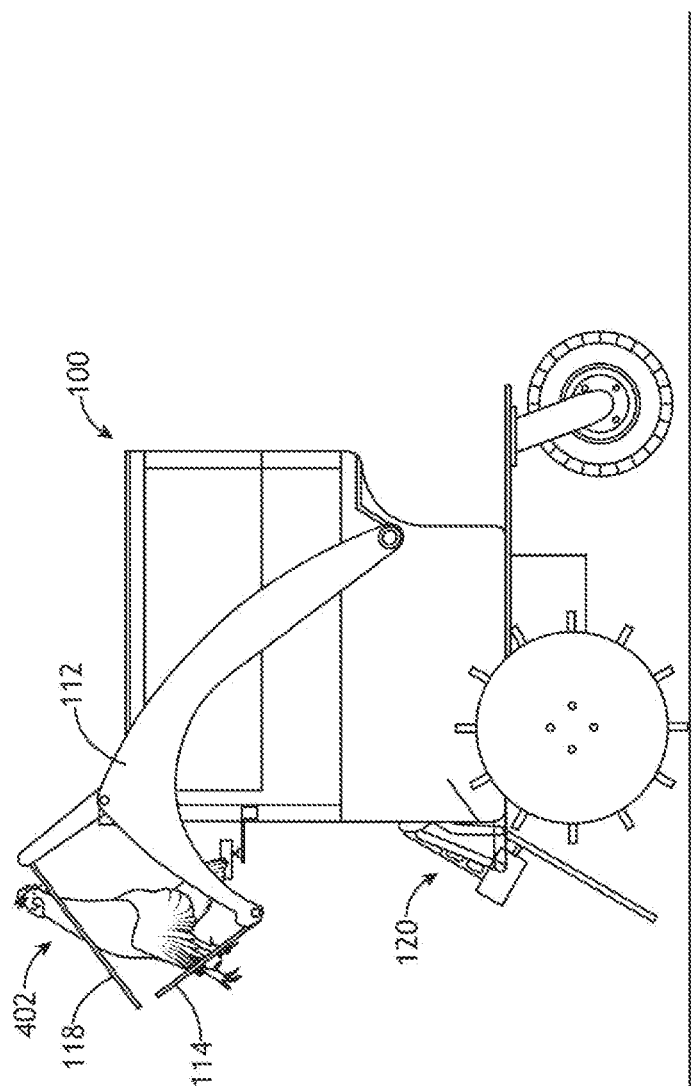
Figure 4F:
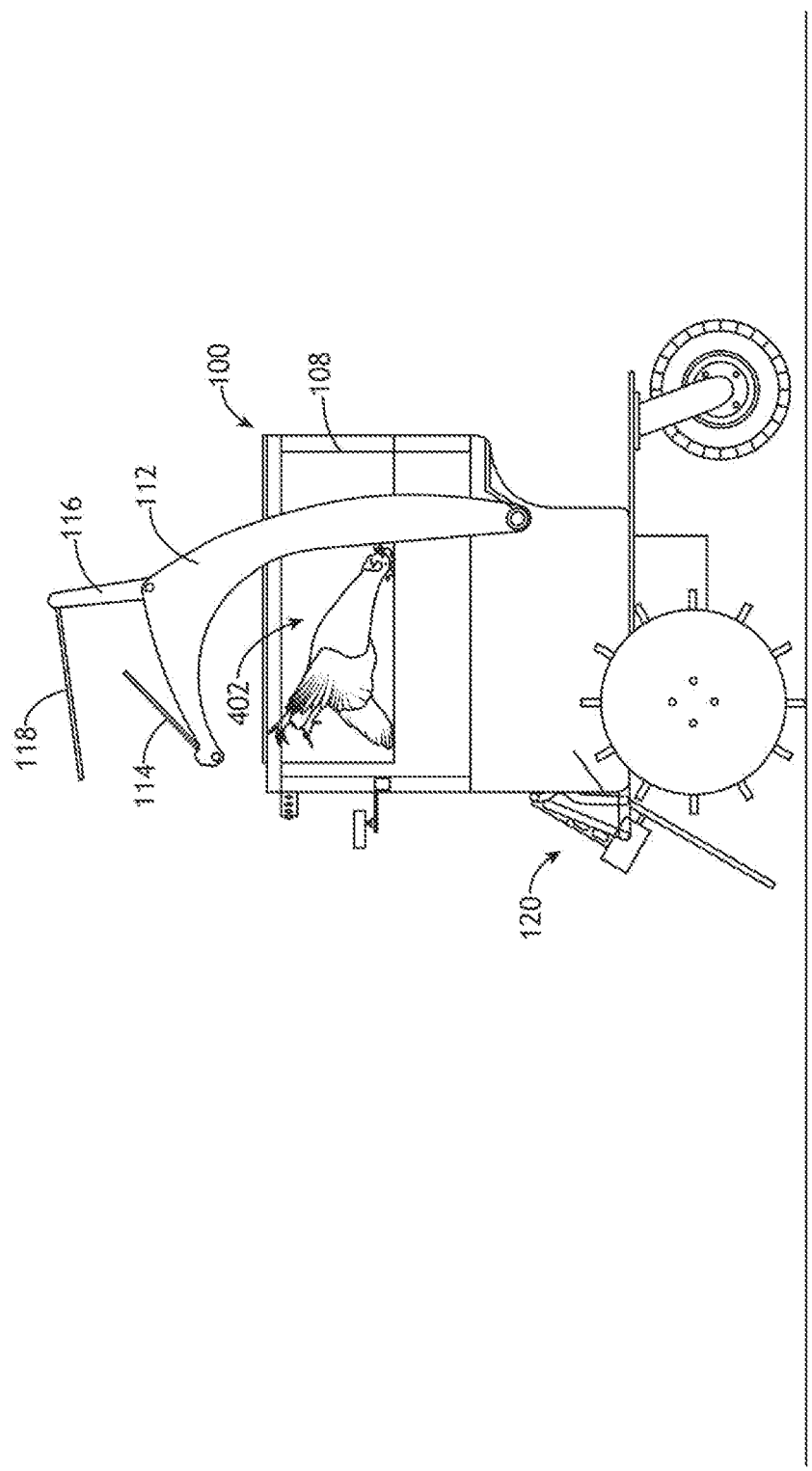
Figure 4G:
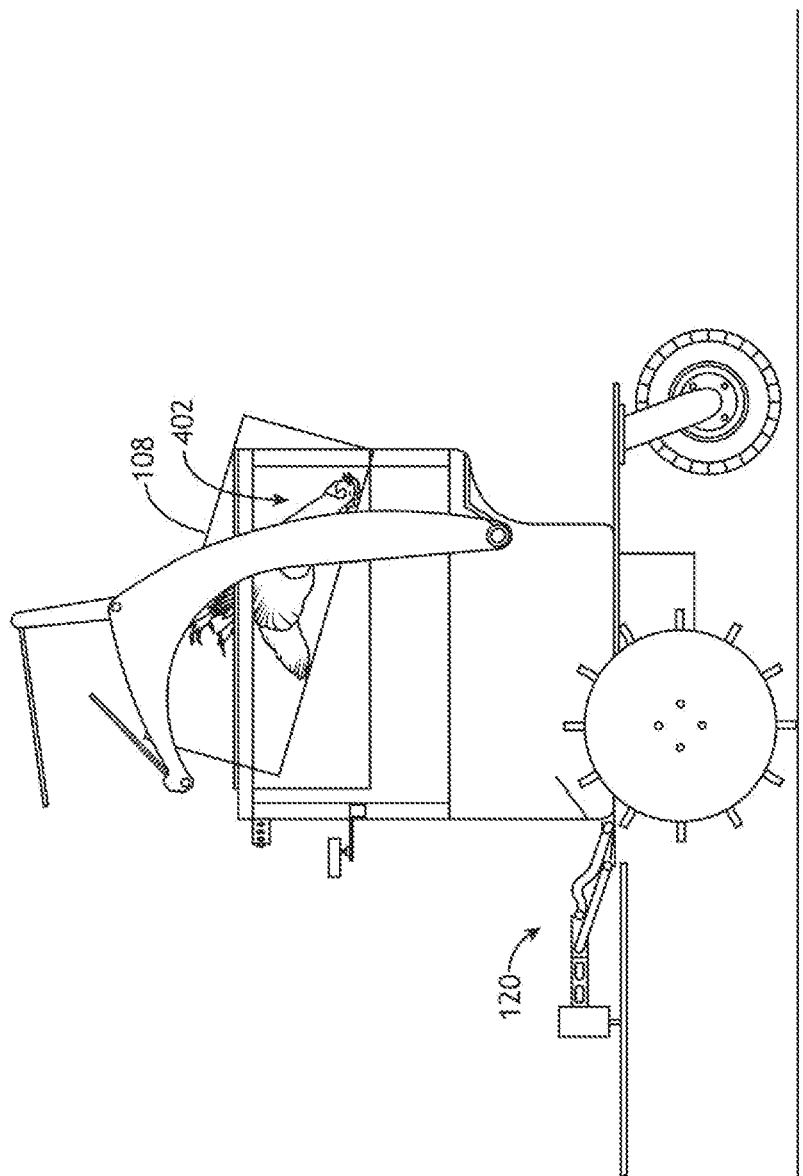
Figure 4H:
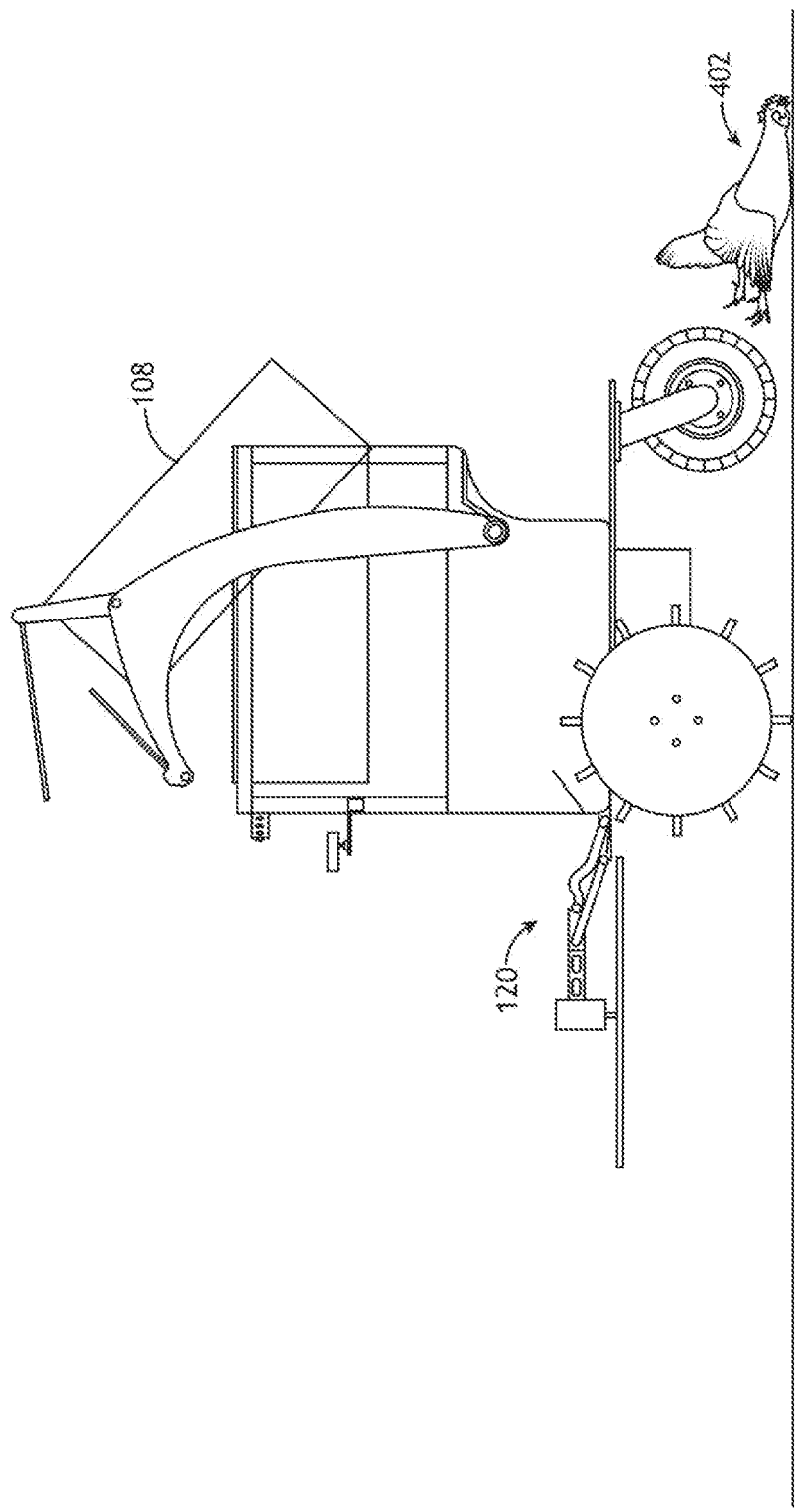

Referring generally to FIGS. 4A-4H, an exemplary implementation of the method 300 by the mortality recovery device 100 is described, in accordance with one or more embodiments of the present disclosure. Referring now to FIG. 4A, the morality recovery device 100 may move autonomously within a barn environment and include a spinner assembly 120 in an extended position for deterring live poultry from the forward path. The mortality recovery device 100 may also capture an image stream of an expired poultry 402 in a forward path (e.g., by the camera 124). Referring now to FIG. 4B, the mortality recovery device 100 may retract the spinner assembly 120 in response to detecting the expired poultry. Referring now to FIG. 4C, the mortality recovery device 100 may deploy the linkage assembly 110 to a ground level in response to retracting the spinner assembly 120. The mortality recovery device 100 may also position the expired poultry between the tines 118 of the grapple member and the platform 114 by engaging the drive wheels 104. Referring now to FIG. 4D, the mortality recovery device 100 may engage the grapple member 116 for conveying the expired poultry 402 onto the platform 114 by way of the tines 118. Referring now to FIGS. 4E-4F, the mortality recovery device 100 may engage the lift member 112 to raise the platform 114 above the container 108 and drop the expired poultry 402 in the container 108. As the lift member 112 is rotated, the tines 118 may clamp the expired poultry 402 to the platform 114 for a least a portion of the time as the expired poultry 402 is raised. Referring now to FIGS. 4G-4H, the spinner assembly 120 may be extended and the mortality recovery device 100 may renew the autonomous movement within the barn environment. As depicted, the mortality recovery device 100 has moved to a dump location. The container 108 may then be rotated to dump the expired poultry 402 from the container 108 at the dump location. By such autonomous recovery and dumping of the expired poultry, a human requirement to recover the expired poultry from the barn may be eliminated.

Figure 5A:
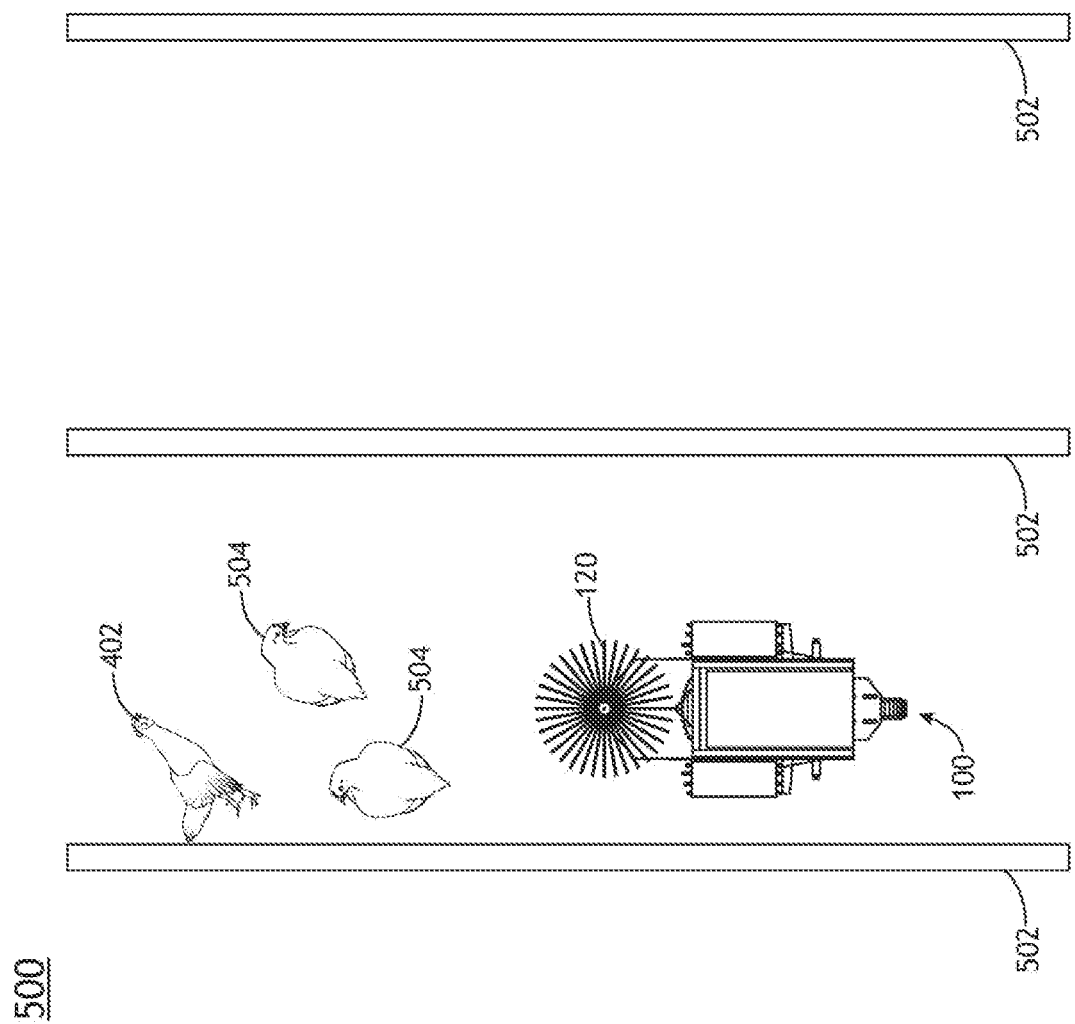
FIG. 5A-5C illustrates a top view of a mortality recovery system, in accordance with one or more embodiments of the present disclosure.
Figure 5B:
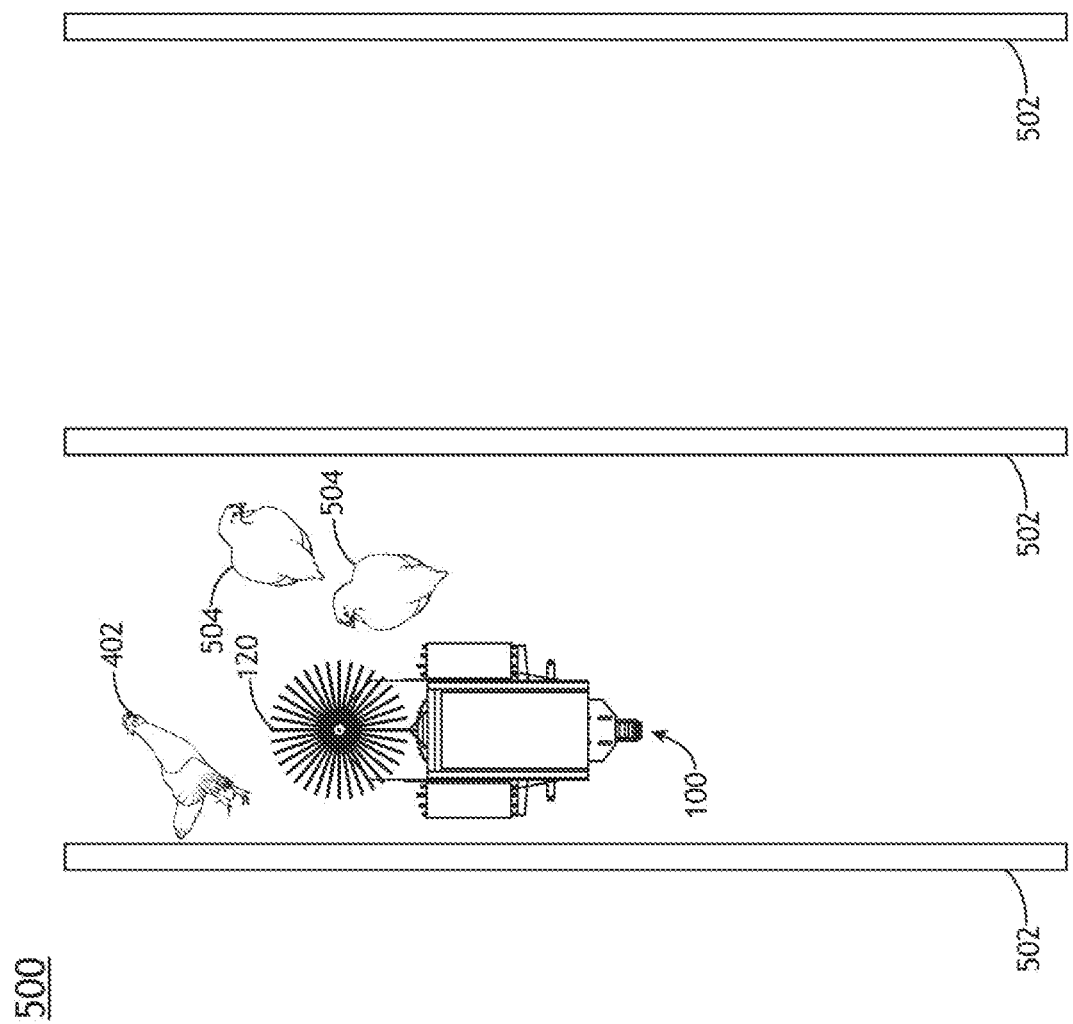
Figure 5C:
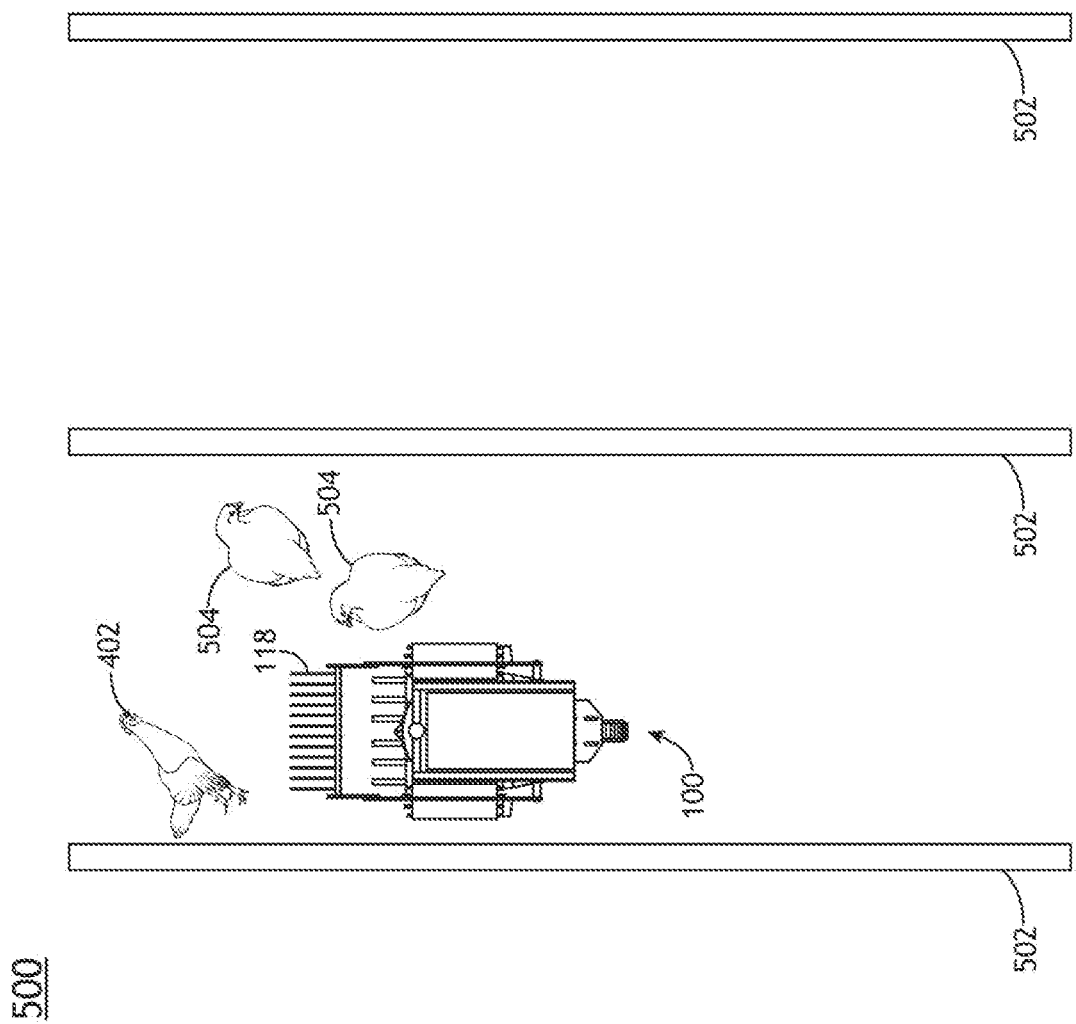
Figure 6A:
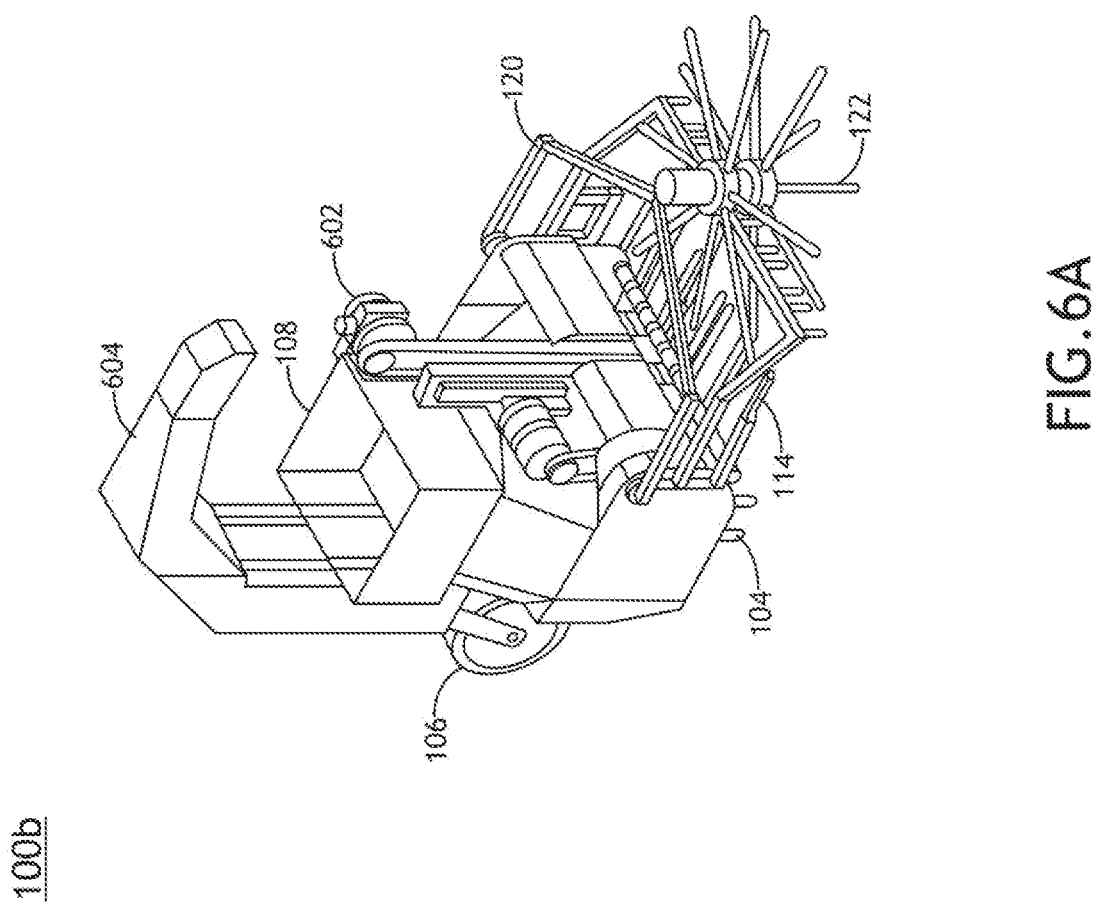
FIG. 6A illustrates a perspective view of a mortality recovery device, in accordance with one or more embodiments of the present disclosure.
Figure 6B:
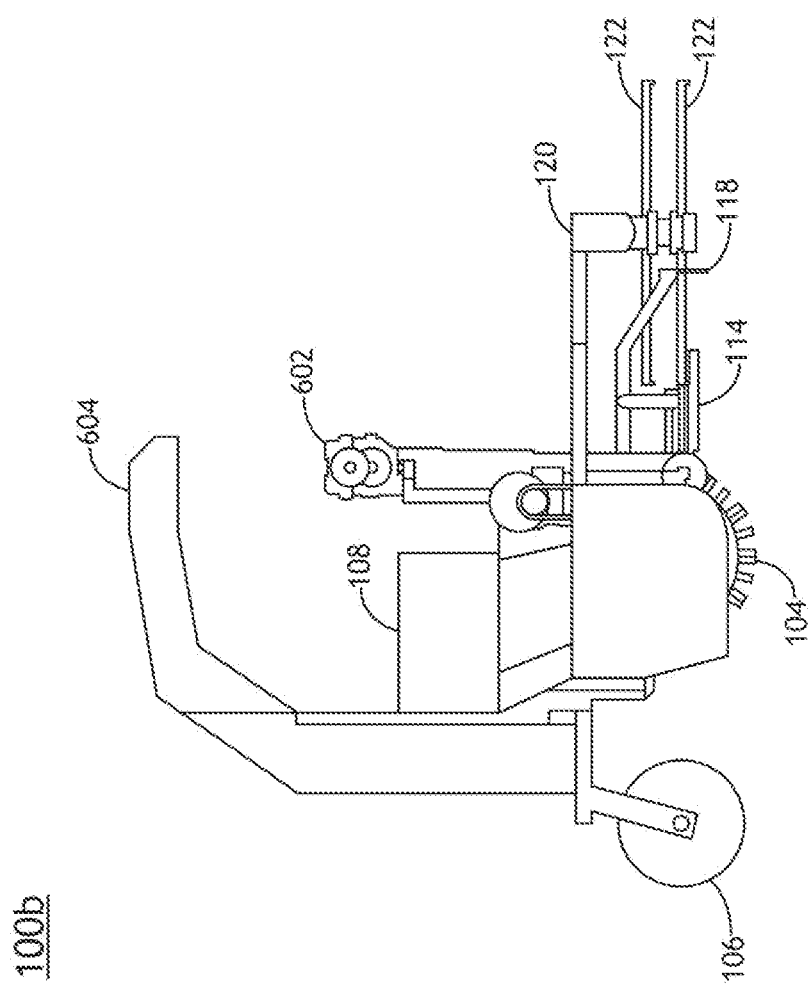
FIG. 6B illustrates a side view of a mortality recovery device, in accordance with one or more embodiments of the present disclosure.
Figure 6C:
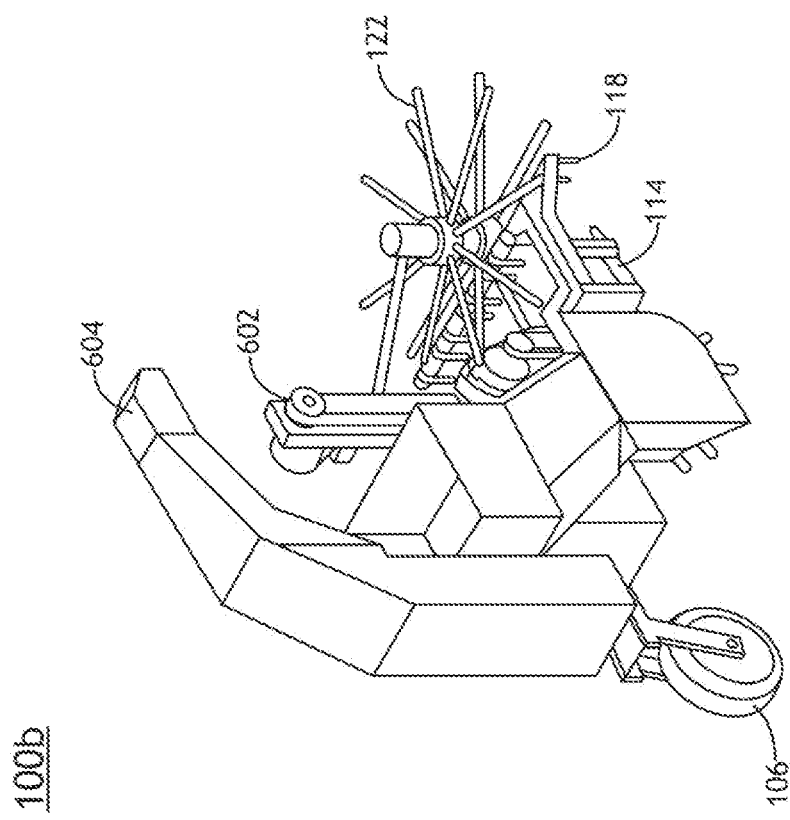
FIG. 6C illustrates a rear perspective view of a mortality recovery device, in accordance with one or more embodiments of the present disclosure.
Figure 6D:
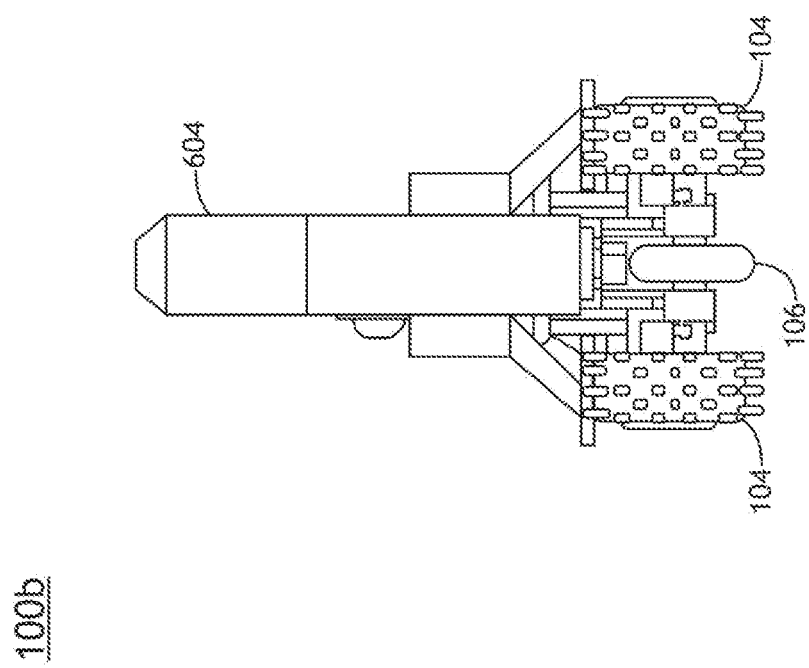
FIG. 6D illustrates a rear view of a mortality recovery device, in accordance with one or more embodiments of the present disclosure.

Referring generally to FIGS. 5A-5C, a mortality recovery system 500 is described, in accordance with one or more embodiments of the present disclosure. The mortality recovery system 500 may include one or more mortality recovery devices 100, expired poultry 402, delivery lines 502, and live poultry 504. A poultry barn may include one or more delivery lines 502, such as, feed lines (also known as feeder lines, feed delivery systems, and the like) and water lines (also known as drinker lines, water delivery systems, and the like). The delivery lines 502 may be may be hung from a ceiling of the poultry house. During the life cycle of the poultry, the delivery lines 502 may be raised from a ground surface for accommodating a beak height of the live poultry 504. Thus, the delivery lines 502 may be adjustable between a range of heights, including, but not limited to, four inches and forty-eight inches. The height of the feed line pipe and the water line pipe may be based on an age of the poultry and a breed of the poultry. For example, the height of the delivery line 502 may be lower for broiler chickens (as compared to turkeys, breeders, layers, or ducks), such as, but not limited to between four and twenty-four inches for such broilers. In embodiments, one or more of the camera 124 or the camera 126 is posed to capture the delivery lines 502 between the various ranges of heights as the height of the delivery line is adjusted to accommodate the poultry. The processors 202 of the mortality recovery device 100 may then detect the delivery lines 502 within the images and engage the drive wheels 104 to avoid the delivery lines 502 by an obstacle avoidance protocol, or the like. In some instances, the delivery lines 502 may function as linear guides which the mortality recovery device 100 may follow when navigating the barn. For example, the processors 202 may use the detected delivery lines 502 in combination with a known pose of the mortality recovery device 100 within the environment for autonomous pathfinding.

As previously described, the mortality recovery device 100 may be configured to provide one or more control signals to the one or more poultry avoidance sub-systems, such as a spinner assembly 120, such that the flexible members 122 cause the live poultry 504 to evacuate a forward path of the mortality recovery device 100. For example, as shown in FIG. 5A, the mortality recovery device 100 may be placed within a poultry environment having one or more live poultry 504 and one or more expired poultry 402. The mortality recovery device 100 may travel within the barn for detecting expired poultry laying on the ground surface. Upon approaching the live poultry 504, the one or more processors 202 may detect the live poultry 504 (e.g., within an image stream from the camera 124, the camera 126, etc.). Upon detecting the live poultry 504, the processors 202 may also provide one or more control signals to the one or more poultry avoidance sub-systems to engage the spinner assembly 120 for rotating the flexible members 122. The flexible members 122 may then may cause the live poultry 504 to evacuate the forward path, as shown in FIG. 5B. The processors 202 may then fail to detect the live poultry in the forward path, indicating the live poultry 504 has evacuated the forward path. When the processors 202 fail to detect the live poultry in the forward path, the spinner assembly 120 may be disengaged. By selectively engaging and disengaging the spinner assembly 120, a power consumption of the mortality recovery device 100 may be reduced thereby improving a battery life. It is noted that, for purposes of the present disclosure, the terms "debird" and "debriding" may refer generally to one or more steps or sub-steps of a method of causing one or more live poultry to evacuate an area within the poultry environment.

Referring now to FIG. 5C, upon approaching the expired poultry 402, the one or more processors 202 may detect the expired poultry 402 (e.g., within the image stream from the camera 124, the camera 126, etc.). Upon detecting the expired poultry 402, the processors 202 may initiate one or more protocols, such as the method 300. In this regard, the mortality recovery device 100 may retract the spinner assembly 120 and deploy the linkage mechanism including the grapple member 116 and the lift member 112. The mortality recovery device 100 may then convey the expired poultry 402 to the container 108.

Referring generally to FIGS. 6A-6D, a mortality recovery device 100b is described, in accordance with one or more embodiments of the present disclosure. Although the mortality recovery device 100 has been described as including the lift member 112, this is not intended as a limitation on the present disclosure. In embodiments, the mortality recovery device 100b includes a poultry retrieval sub-system configured to engage with one or more expired poultry and recover them from a poultry environment. The poultry retrieval sub-system may include, but are not limited to, the platform 114 and one or more chain drives 602 (e.g., chain and gear drive, grapple, or the like) configured to lift the platform 114. The platform 114 may thus be configured to lift expired poultry and deposit the expired poultry into the container 108.

In embodiments, the mortality recovery device 100b includes a housing arm 602 coupled to the chassis 102. One or more components of the mortality recovery device 100b may be disposed within the housing arm, such as, but not limited to, one or more cameras, controllers, or lights.

Referring generally again to FIGS. 1A-6D, although the mortality recovery device 100 is described as including the spinner, this is not intended as a limitation of the present disclosure. It is contemplated that the mortality recovery device 100 may include alternative deterrent components for deterring live poultry from the forward path. For example, the deterrent components may include a contact deterrent, such as a push bar. By way of another example, the deterrent components may include a non-contact deterrent, such as, but not limited to, a light-based deterrent (e.g., a stroboscope, a laser, etc.), or a sound-based deterrent.

The mortality recovery device 100 may also include one or more ambient condition sensors, such as, but not limited to, a temperature sensor, a humidity sensor, an air quality sensor (e.g., a carbon dioxide sensor, an oxygen sensor, a nitrogen sensor, etc.), and the like.

While the present disclosure may refer to identification of one or more poultry and determination of an expiration condition of the one or more poultry using a segmentation algorithm, it is noted that the embodiments of the present disclosure are not limited to using a segmentation algorithm identification of one or more poultry and determination of an expiration condition of the one or more poultry. For example, a segmentation algorithm may be employed (e.g., by the one or more controllers) to identify any object within a poultry environment, including, without limitation, feeders, obstacles, barriers, fences, or the like. In this regard, one or more images indicative of one or more of conditions, objects, or poultry within a poultry environment may be received from the camera 124, the camera 126, or the like. The one or more camera images may also capture one or more related items within the poultry environment (e.g., any item the detection/identification of which is not desired). The processors 202 may perform one or more editing processes on the one or more camera images, including, without limitation, one or more cropping functions. The processors 202 may also detect the one or more objects of interest. For example, the processors 202 may detect one or more objects of interest by detecting features of interest (e.g., one or more features expected to be present in an image of the object of interest) within the one or more camera images. Conversely, the processors 202 may indirectly detect the one or more objects of interest by detecting sections of the one or more camera images that lack one or more features of interest. It is noted that the processors 202 may be trained to detect the one or more features of interest using any method known in the art to be suitable for the purposes of the present disclosure, including, without limitation, one or more machine-learning classification methods. It is further noted that the processors 202 may be trained to detect multiple features of interest expected to be present in an image of multiple different objects of interest. In this way, the processors 202 may be configured to detect objects of interest without explicit direction to detect only features of interest corresponding to a certain object of interest. The one or more objects of interest are classified. For example, the one or more objects of interest may be classified as at least one of a live poultry, an expired poultry, an obstacle, or the like, based on the one or more features of interest.

In embodiments, the processors 202 may develop and/or train a machine learning analyzer using data collected by the mortality recovery device 100. Upon development of a machine learning analyzer, the one or more processors may apply the machine learning analyzer to one or more signals indicative of one or more conditions within a poultry environment. In this regard, the one or more controllers 201 may be configured to determine one or more conditions within a poultry environment (e.g., one or more obstacles, one or more poultry birds, one or more expiration conditions of one or more poultry birds, or one or more maps of the poultry environment) using the machine learning analyzer. It is noted that the embodiments of the present disclosure are not limited to the determination of conditions within a poultry environment via machine learning processes. For example, as previously described, the one or more processors may employ one or more computer vision algorithms configured to determine one or more conditions within a poultry environment. By way of another example, the one or more controllers 201 may be configured to determine whether one or more poultry within the poultry environment are expired (e.g., dead) or alive via one or more computer vision algorithms. By way of another example, the one or more algorithms may include a segmentation algorithm.

In embodiments, the mortality recovery device 100 is communicatively coupled to or includes one or more user interfaces. The user interfaces may include, but are not limited to, one or more desktops, tablets, smartphones, smart watches, and the like. In embodiments, a user may use the user interface to view various data stored in memory, such as, but not limited to, a mortality recovery schedule or sensor data. Those skilled in the art should recognize that any display device capable of integration with the user interface is suitable for implementation in embodiments of the present disclosure. In embodiments, a user may input selections and/or instructions responsive to data displayed to the user via the user interface.

Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like Furthermore, the results may be stored "permanently," "semi-permanently," temporarily, or for some period of time. For example, the memory may be random access memory (RAM), and the results may not necessarily persist indefinitely in the memory.

It is further contemplated that each of the embodiments of the methods described above may include any other step(s) of any other method(s) described herein. In addition, each of the embodiments of the methods described above may be performed by any of the systems described herein.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The one or more components of the mortality recovery device 100 may be communicatively coupled to the various other components of the mortality recovery device 100 in any manner known in the art. For example, processors may be communicatively coupled to each other and other components via a wireline (e.g., copper wire, fiber optic cable, and the like) or wireless connection (e.g., RF coupling, IR coupling, data network communication (e.g., WiFi, WiMax, Bluetooth and the like).

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that embodiments of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A mortality recovery device comprising:
   a chassis;
   a container coupled to the chassis;
   one or more drive wheels for propelling the chassis in a forward path;
   a linkage assembly including a lift member and a grapple member, the lift member coupled to the chassis, the lift member including a platform, wherein the lift member is configured to rotate relative to the chassis thereby lifting the platform above the container, wherein the grapple member is coupled to the lift member and is configured to rotate relative to the lift member;
   a first camera posed such that the first camera is configured to capture a first image stream including at least a first area disposed in the forward path;
   one or more processors and a memory, the one or more processors configured to execute a set of program instructions stored in the memory, the set of program instructions configured to cause the one or more processors to:

perform image recognition on the first image stream to detect an expired poultry in the forward path;
rotate the grapple member relative to the lift member for conveying the expired poultry onto the platform; and
rotate the lift member relative to the chassis for conveying the expired poultry from the platform to the container.

2. The mortality recovery device of claim 1, wherein the one or more drive wheels include a spiked tread for tilling a bedding as the one or more drive wheels are rotated.

3. The mortality recovery device of claim 2, wherein the one or more drive wheels include a first drive wheel and a second drive wheel, wherein the first drive wheel and the second drive wheel are independently controllable for propelling and turning the chassis.

4. The mortality recovery device of claim 3, further comprising a caster wheel coupled to the chassis behind the first drive wheel and the second drive wheel relative to the forward path; wherein the caster wheel is configured to rotate relative to the chassis.

5. The mortality recovery device of claim 1, wherein the set of program instructions are further configured to cause the one or more processors to control the one or more drive wheels to position the expired poultry between the platform and the grapple member in response to detecting the expired poultry.

6. The mortality recovery device of claim 1, wherein the image recognition is one of a blob detection method comparing a color offset of the expired poultry relative to a bedding or an image classification model.

7. The mortality recovery device of claim 1, wherein the grapple member includes a plurality of tines, wherein the rotation of the grapple member relative to the lift member causes the plurality of tines to move towards the platform, wherein the expired poultry is conveyed onto the platform by way of the plurality of tines.

8. The mortality recovery device of claim 7, wherein the grapple member is configured to translate the plurality of tines upwards as the platform is raised for clamping the expired poultry between the plurality of tines and the platform.

9. The mortality recovery device of claim 1, wherein the platform includes a plurality of tines.

10. The mortality recovery device of claim 1, further comprising a spinner assembly including a plurality of flexible members; wherein the spinner assembly is configured to rotate the plurality of flexible members for deterring a live poultry from the forward path.

11. The mortality recovery device of claim 10, wherein the spinner assembly is configured to rotate the plurality of flexible members parallel to a ground surface.

12. The mortality recovery device of claim 11, wherein the set of program instructions are further configured to cause the one or more processors to:
perform image recognition on the first image stream to detect the live poultry; and
engage the spinner assembly to rotate the plurality of flexible members in response to detecting the live poultry.

13. The mortality recovery device of claim 12, wherein the set of program instructions are further configured to cause the one or more processors to:
perform image recognition on the first image stream and fail to detect the live poultry in the forward path; and
disengage the spinner assembly in response to failing to detect the live poultry in the forward path.

14. The mortality recovery device of claim 10, wherein the spinner assembly is retractable, wherein the set of program instructions are further configured to cause the one or more processors to retract the spinner assembly in response to detecting the expired poultry in the forward path.

15. The mortality recovery device of claim 1, further comprising at least one of:
a second camera posed such that the second camera is configured to capture a second image stream including at least a portion of a ceiling disposed above the mortality recovery device; or
a light detection and ranging (LiDAR) sensor configured to capture a point cloud;
wherein the set of program instructions are further configured to cause the one or more processors to:
map an environment surrounding the mortality recovery device based on at least one of the second image stream or the point cloud;
determine a pose of the mortality recovery device within the map of the environment; and
control the one or more drive wheels based on the pose of the mortality recovery device within the map of the environment for navigating the mortality recovery device within the environment.

16. The mortality recovery device of claim 15, further comprising a third camera posed such that the third camera is configured to capture a third image stream including a second area at a height of between four and forty-eight inches from the ground;
wherein the set of program instructions are further configured to cause the one or more processors to:
perform image recognition on the third image stream to detect at least one of a feed line or a water line; and
control the one or more drive wheels based on the pose of the mortality recovery device within the map of the environment and the detected at least one of the feed line or the water line for avoiding the at least one of the feed line or the water line.

17. The mortality recovery device of claim 16, wherein the second area is at a height of between four and twenty-four inches from the ground; wherein the expired poultry is a broiler chicken.

18. The mortality recovery device of claim 15, wherein the first camera is posed such that the first image stream further includes at least a portion of a second area disposed at a height of between four and forty-eight inches from the ground;
wherein the set of program instructions are further configured to cause the one or more processors to:
perform image recognition on the first image stream to detect at least one of a feed line or a water line; and
control the one or more drive wheels based on the pose of the mortality recovery device within the map of the environment and the detected at least one of the feed line or the water line for avoiding the at least one of the feed line or the water line.

19. A mortality recovery system comprising:
a poultry barn including a ceiling, a ground, plurality of feed lines, and a plurality of water lines; wherein the plurality of feed lines and the plurality of water lines are disposed between four and forty-eight inches from the ground; and
a mortality recovery device including:
a chassis;
a container coupled to the chassis;
one or more drive wheels for propelling the chassis in a forward path;

a linkage assembly including a lift member and a grapple member, the lift member coupled to the chassis, the lift member including a platform, wherein the lift member is configured to rotate relative to the chassis thereby lifting the platform above the container, wherein the grapple member is coupled to the lift member and is configured to rotate relative to the lift member;

a first camera posed such that the first camera is configured to capture a first image stream including at least a first area disposed in the forward path;

one or more processors and a memory, the one or more processors configured to execute a set of program instructions stored in the memory, the set of program instructions configured to cause the one or more processors to:

perform image recognition on the first image stream to detect an expired poultry in the forward path;

rotate the grapple member relative to the lift member for conveying the expired poultry onto the platform; and rotate the lift member relative to the chassis for conveying the expired poultry from the platform to the container.

20. A method of mortality recovery comprising:

detecting, by one or more processors, an expired poultry in an image received from a camera by applying an image recognition model to the image;

engaging one or more drive wheels to position the expired poultry between a grapple member and a platform of a lift member by providing a control signal from the one or more processors to one or more drive wheel motors;

engaging the grapple member to convey the expired poultry onto the platform by rotating the grapple member relative to the lift member; and engaging the lift member to convey the expired poultry from the platform to a container by rotating the lift member relative to a chassis.

* * * * *